US008521693B2

United States Patent
Ito et al.

(10) Patent No.: US 8,521,693 B2
(45) Date of Patent: Aug. 27, 2013

(54) STORAGE SYSTEM AND ITS OPERATION METHOD

(75) Inventors: Akira Ito, Yokohama (JP); Takahiro Nakano, Yokohama (JP); Nobumitsu Takaoka, Sagamihara (JP); Etsutaro Akagawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 486 days.

(21) Appl. No.: 12/992,031

(22) PCT Filed: Oct. 26, 2010

(86) PCT No.: PCT/JP2010/006323
§ 371 (c)(1),
(2), (4) Date: Nov. 10, 2010

(87) PCT Pub. No.: WO2012/056494
PCT Pub. Date: May 3, 2012

(65) Prior Publication Data
US 2012/0101973 A1 Apr. 26, 2012

(51) Int. Cl.
*G06F 7/00* (2006.01)
(52) U.S. Cl.
USPC .......................................................... 707/641
(58) Field of Classification Search
USPC .......................................................... 707/641
See application file for complete search history.

(56) References Cited

U.S. PATENT DOCUMENTS

| 7,225,211 B1 | 5/2007 | Colgrove et al. |
| 7,594,076 B2 | 9/2009 | Tsumagari et al. |
| 2007/0118710 A1* | 5/2007 | Yamakawa et al. ........... 711/165 |

* cited by examiner

*Primary Examiner* — Truong Vo
(74) *Attorney, Agent, or Firm* — Foley & Lardner LLP

(57) ABSTRACT

Predicting whether a file migration will be executed successfully or not.
A file storage apparatus in a high-order tier generates a migration task list that records scheduled time periods of migration execution and a total file size of files which are targets to be migrated, and transfers the generated migration task list to a file storage apparatus in a low-order tier; and the file storage apparatus in the low-order tier generates, based on the migration task list, a migration overlap table that records, for each unit time, whether the execution of a migration is scheduled or not, and a remaining file size table that records a predicted value of a data transfer amount for each unit time and a predicted value of a remaining file size for each unit time; and if the predicted value in the last scheduled time period, from among the predicted value of the remaining file size for each unit time which is recorded in the remaining file size table, is equal to or less than 0, it is predicted that the migration will be executed successfully; and if the predicted value in the last scheduled time period is more than 0, it is predicted that the execution of the migration will fail.

15 Claims, 19 Drawing Sheets

FIG.7

| Time | 0:00 | 0:10 | 0:20 | 0:30 | 0:40 | 0:50 | 1:00 | 1:10 | 1:20 | 1:30 | 1:40 | 1:50 | 2:00 |
|---|---|---|---|---|---|---|---|---|---|---|---|---|---|
| FSA1-Transfer data | 0 | 0 | 0 | 0 | 0 | 0 | 200 MB | 200 MB | 300 MB | 300 MB | 300 MB | 300 MB | 600 MB |
| FSA2-Transfer data | 600 MB | 600 MB | 600 MB | 300 MB | 300 MB | 300 MB | 200 MB | 200 MB | 300 MB | 300 MB | 300 MB | 300 MB | 0 |
| FSB1-Transfer data | 0 | 0 | 0 | 300 MB | 300 MB | 300 MB | 200 MB | 200 MB | 0 | 0 | 0 | 0 | 0 |
| ... | | | | | | | | | | | | | |
| FSA1 | 0 | 0 | 0 | 0 | 0 | 0 | 3600 MB | 3400 MB | 3200 MB | 2900 MB | 2600 MB | 2300 MB | 2000 MB |
| FSA2 | 4200 MB | 3600 MB | 3000 MB | 2400 MB | 2100 MB | 1800 MB | 1500 MB | 1300 MB | 1100 MB | 800 MB | 500 MB | 200 MB | 0 |
| FSB1 | 0 | 0 | 0 | 1200 MB | 900 MB | 600 MB | 300 MB | 100 MB | 0 | 0 | 0 | 0 | 0 |
| ... | | | | | | | | | | | | | |

STORAGE SYSTEM AND ITS OPERATION METHOD

TECHNICAL FIELD

The present invention relates to a storage system and its operation method. Particularly, this invention relates to a storage system having a function predicting the progress of file migrations in hierarchical file storage apparatuses.

BACKGROUND ART

One method for efficiently using the capacity of a storage system is a hierarchical storage management (HSM) method. Management targets of the HSM are generally two or more storage apparatuses including a high-speed, small-capacity storage apparatus and a low-speed, large-capacity storage apparatus and there is a mutual hierarchical relationship between the storage apparatuses which are management targets.

If a hierarchical layer(s) is referred to as a tier(s), the high-speed, small-capacity storage tier may be referred to as the high-order tier (Tier 1) and the low-speed, large-capacity storage tier may be referred to as the low-order tier (Tier 2). When managing the hierarchical file storage apparatuses by the HSM method, sufficient utilization of the storage capacity can be ensured by firstly storing data in the high-order tier and then migrating data whose use frequency is low, from among the data stored in the high-order tier, to the low-order tier.

With conventional hierarchical file storage apparatuses, a file storage apparatus belonging to the high-order tier and a file storage apparatus belonging to the low-order tier, from among a plurality of file storage apparatuses, are connected to each other via a WAN (Wide Area Network) or a LAN (Local Area Network) and migration target files designated according to, for example, policies are migrated from the high-order tier to the low-order tier.

If a plurality of file systems exist in the file storage apparatus in each tier under the circumstance described above, file migrations are performed from a plurality of file systems belonging to the high-order tier to a plurality of file systems belonging to the low-order tier during a time period designated by the user (generally a time period such as late at night when the migrations will have little effect on the performance of services provided to the user).

The user can access files through a file sharing service that operates on the file storage apparatus in the high-order tier. In this case, a technique for accessing files existing in the low-order tier via a stub located in the high-order tier is disclosed in Patent Literature 1.

Furthermore, regarding a method for predicting the execution of migrations, a method for predicting the execution of migrations based on load on the high-order tier is suggested as disclosed in Patent Literature 2.
Citation List
Patent Literature
PTL 1: U.S. Pat. No. 7,225,211
PTL 2: U.S. Pat. No. 7,594,076

SUMMARY OF INVENTION

Technical Problem

When predicting the execution of migrations, the method disclosed in Patent Literature 2 gives consideration to only the load on storage devices in the high-order tier. When migrations from the plurality of high-order tiers to the low-order tier are executed, the load may be concentrated on the low-order tier, but it is impossible to deal with this concentration of the load. It is also impossible to perform processing for reducing the load on the high-order tiers according to the status of the low-order tier.

Specifically speaking, when migration tasks are executed on a plurality of file systems in the plurality of file storage apparatuses in the high-order tier, even if the execution of migrations is predicted based on the load on the storage devices in the high-order tier, it is difficult to predict whether the migrations will be successful or not.

In other words, if migration tasks are executed independently from each other on the plurality of file systems in the plurality of file storage apparatuses in the high-order tier, it can be predicted that a network band may become deficient or the load may be concentrated on the file storage apparatus in the low-order tier due to the plurality of migration tasks. So, there is a possibility that the migrations may not be completed within the specified time.

If there is a possibility that the migrations may not be completed within specified time, the relationship and priorities between the migration tasks have to be considered in order to deal with the situation, which causes a system administrator trouble.

Furthermore, when predicting whether the migrations will be successful or not, it is necessary to consider how many files should be migrated and, otherwise, it is difficult to manage the capacity of the low-order tier. It is also possible to predict when the capacity of each tier will be depleted. So, addition of the capacity or other necessary actions cannot be performed efficiently.

The present invention was devised in light of the above-described problems of the conventional art and it is an object of this invention to provide a storage system capable of accurately predicting whether file migration will be executed successfully or not, and a method for operating such a storage system.

Solution to Problem

In order to achieve the above-described object, this invention provides a storage system comprising: a plurality of first file storage apparatuses including a first storage apparatus having a plurality of first volumes constituting a logical storage area of a first storage device, and a first controller for controlling data input/output processing on a plurality of first file systems constructed on the first volumes of the first storage apparatus; and a second file storage apparatus connected to the first file storage apparatus via a first network, the second file storage apparatus including a second storage apparatus having a plurality of second volumes constituting a logical storage area of a second storage device, and a second controller for controlling data input/output processing on a plurality of second file systems constructed on the second volumes of the second storage apparatus; wherein the first controller includes a first pre-migration processor for generating a first migration task list that associates and records information about scheduled time periods for execution of a first migration from the first file systems to the second file systems and a total file size of files, which are targets of the first migration, with a file system which is a first migration destination, and then transferring the generated first migration task list to the second file storage apparatus before execution of the first migration; wherein the second controller includes a second pre-migration processor for generating, based on the first migration task list transferred from the first pre-migration processor, a second migration overlap table that records, for each unit time, whether the execution of the first migration is scheduled or not for each of the file systems which are first migration sources whose at least part of the scheduled time periods for the execution of the first migration overlaps with each other; and generating, based on the generated second migration overlap table, a second remaining file size table that records, for each of the file systems which are the first migration sources, a predicted value of a data transfer amount per unit time and a predicted value of a remaining file size per unit time; and wherein the second pre-migration processor predicts, based on the generated second remaining file size table, whether the first migration will be executed successfully or not.

Other problems disclosed in the present application and means for solving the problems will be clarified in the section of embodiments for carrying out this invention and the attached drawings.

Advantageous Effects of Invention

According to this invention, whether file migrations between a plurality of file storage apparatuses will be executed successfully or not can be predicted accurately in advance.

BRIEF DESCRIPTION OF DRAWINGS

FIG. 7 is a configuration diagram showing an example of a remaining file size table.

DESCRIPTION OF EMBODIMENTS

Embodiments of the present invention will be explained below with reference to the attached drawings.

First Embodiment

This embodiment is designed on the assumption that a single file storage apparatus for Tier 2 exists as a migration destination with respect to a plurality of file storage apparatuses for Tier 1; and whether the migration execution will be successful or not in that case is predicted.

Incidentally, this embodiment is designed on the assumption that migrations are set and executed on a file system basis; however, the migrations may be set and executed on a directory or volume basis.

Figure 1:
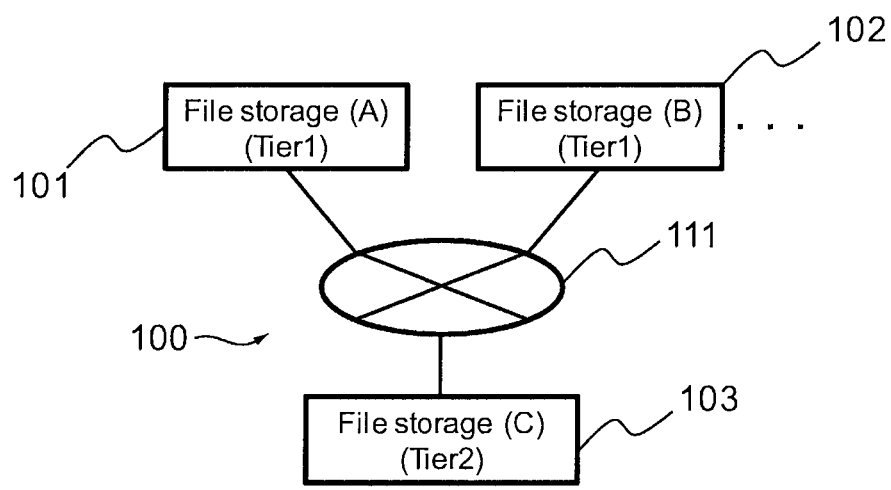
FIG. 1 is a configuration diagram of a storage system according to a first embodiment.

FIG. 1 is a configuration diagram of a storage system according to the first embodiment. Referring to FIG. 1, a storage system 100 includes hierarchical file storage apparatuses that are a plurality of storage devices (not shown in the drawing) hierarchized by dividing them into a plurality of tiers according to performance of each storage device.

Specifically speaking, the storage system 100 includes: a file storage apparatus (A) 101 and a file storage apparatus (B) 102 that have storage devices belonging to a high-order tier (Tier 1) (first storage devices); and a file storage apparatus (C) 103 that has storage devices belonging to a low-order tier (Tier 2) (second storage device). The file storage apparatuses 101, 102, 103 are mutually connected via a network 111. For example, a WAN or LAN is used as the network 111.

Incidentally, the file storage apparatus may sometimes referred to as the file storage in each of the following embodiments.

Figure 2:
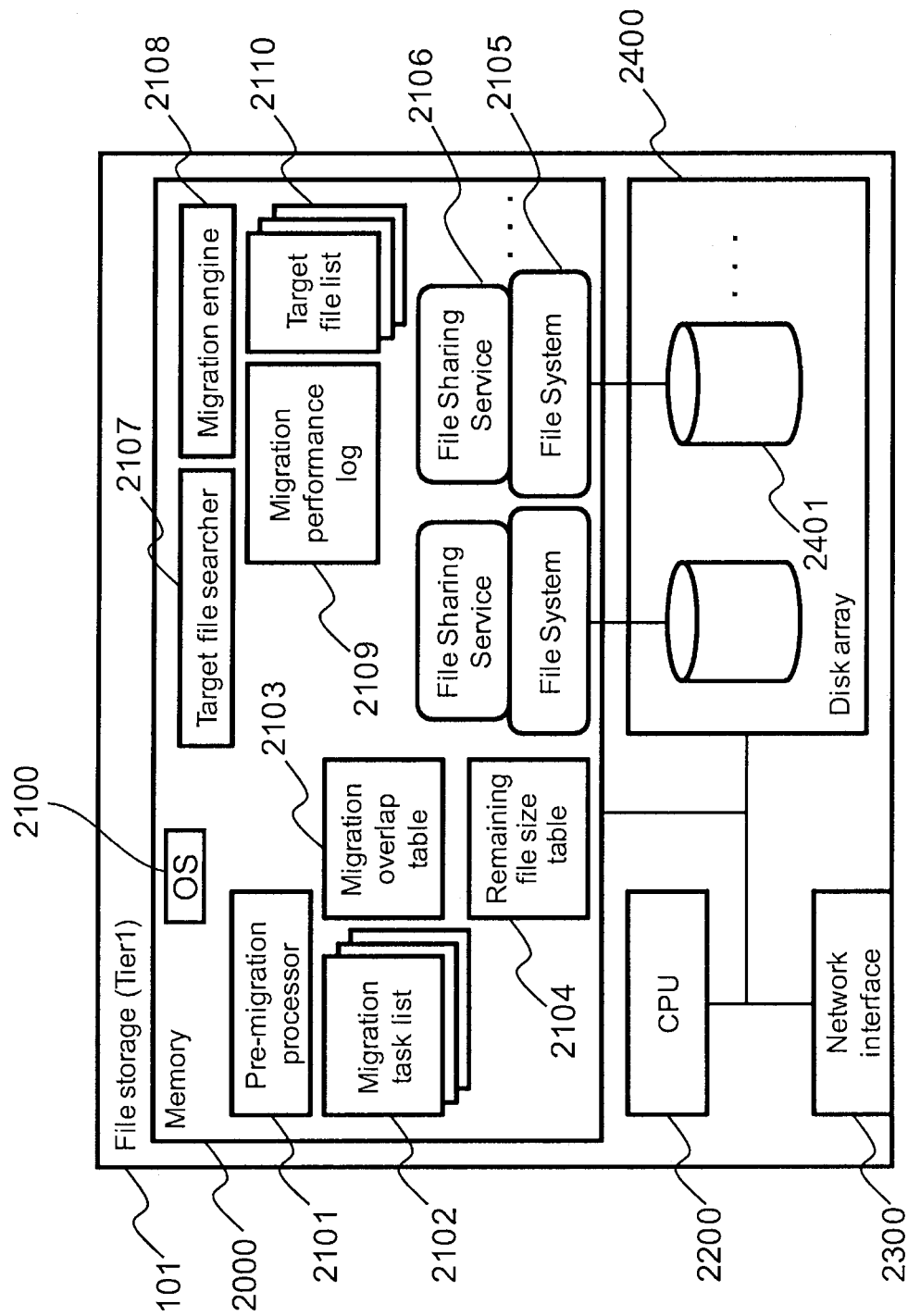
FIG. 2 is a configuration diagram of a file storage apparatus in Tier 1.

FIG. 2 is a configuration diagram showing the internal configuration of the file storage apparatus 101, 102 for Tier 1 shown in FIG. 1. Incidentally, since the file storage apparatuses 101, 102 have the same configuration, the internal configuration of the file storage apparatus 101 will be explained below.

Referring to FIG. 2, the file storage apparatus 101 includes: a memory 2000 storing, for example, programs used for execution; a CPU 2200 for activating the programs stored in the memory 2000 and carrying out the operation; a network interface 2300 for connecting to other file storage apparatuses 102, 103 via the network 111; and a disk array apparatus 2400 for storing data.

The memory 2000 stores: an OS (Operating System) 2100; a pre-migration processor 2101 for executing processing necessary for a prediction before executing a migration; migration task lists 2102 describing migration task schedules for each file system on which a migration is to be executed; a migration overlap table 2103 describing the execution time of each migration task and an overlapping status; and a remaining file size table 2104 describing the total size of remaining migration target files for each migration execution time period.

Furthermore, the memory 2000 stores: one or more file systems 2105; a file sharing service 2106 operating on each file system 2105; a target file searcher 2107 for generating target file lists 2110 by searching for files, which are file migration targets, according to policies and the like set by a user; a migration engine 2108 for executing a file migration based on the target file lists 2110; a migration performance log 2109 in which the performance measured in migrations executed in the past is recorded; and the target file lists 2110 in which lists of migration target files for each file system 2105 are recorded.

The disk array apparatus 2400 is configured as a first storage apparatus having a plurality of volumes 2401 for storing files on the file systems 2105 and each volume 2401 exists for each file system 2105.

Under this circumstance, each volume 2401 functions as a first logical volume constituting a logical storage area of a storage device and the CPU 2200 functions as a first controller for controlling data input/output processing on the plurality of file systems 2105 constructed on each volume 2401. As storage devices, for example, SSDs (Solid State Drives) which are high-speed, small-capacity storage devices can be used.

Figure 3:
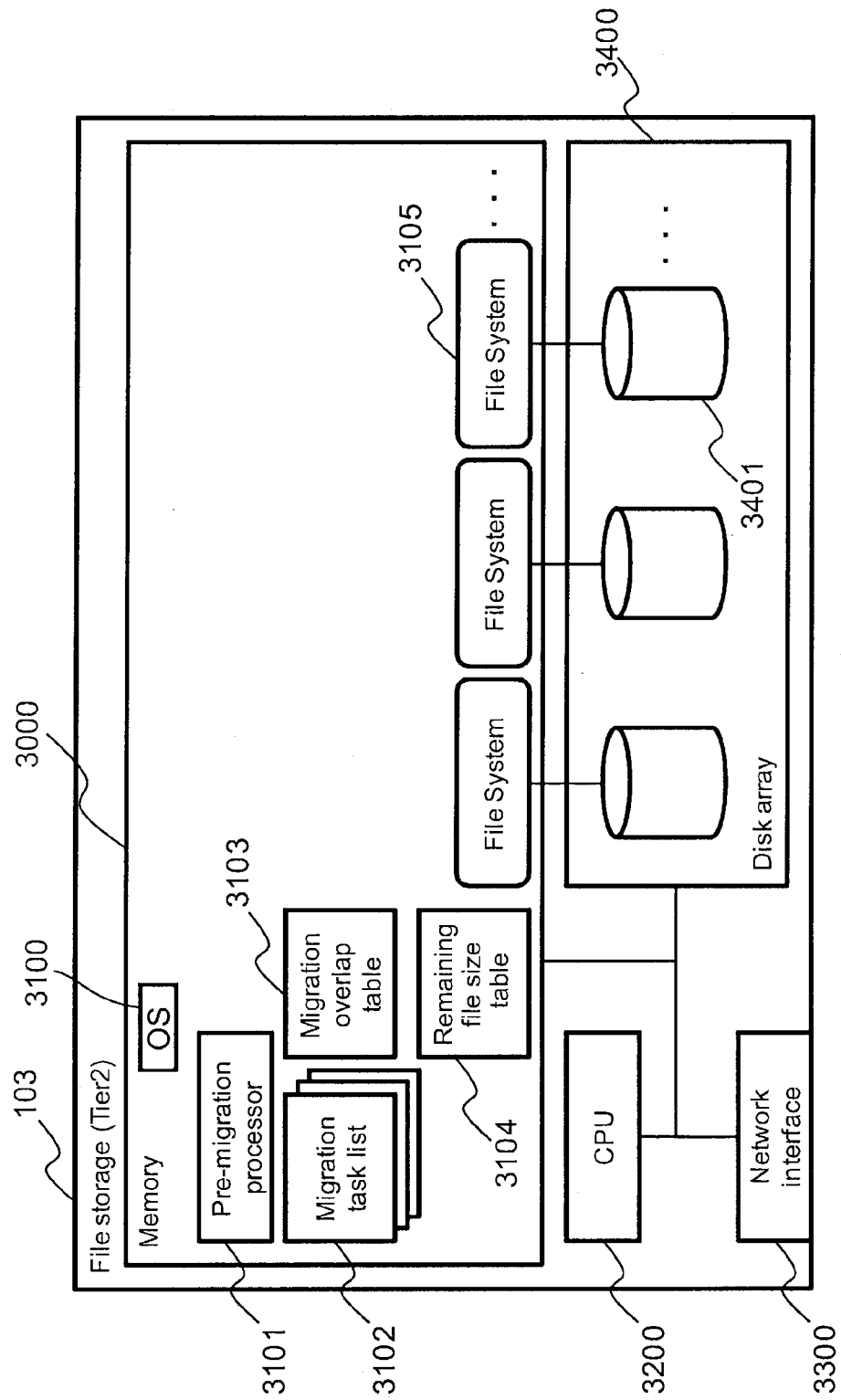
FIG. 3 is a configuration diagram of a file storage apparatus in Tier 2.

FIG. 3 is a configuration diagram showing the internal configuration of the file storage apparatus 103 for Tier 2 shown in FIG. 1.

Referring to FIG. 3, the file storage apparatus 103 includes: a memory 3000 storing, for example, programs used for execution; a CPU 3200 for activating the programs stored in the memory 3000 and carrying out the operation; a network interface 3300 for connecting to other file storage apparatuses 101, 102 via the network 111; and a disk array apparatus 3400 for storing data.

The memory 3000 stores: an OS (Operating System) 3100; a pre-migration processor 3101 for executing processing necessary for a prediction before executing a migration; migration task lists 3102 describing migration task schedules for each file system 3105 on which a migration is to be executed; a migration overlap table 3103 describing the execution time of each migration task and an overlapping status; a remaining file size table 3104 describing the total size of remaining migration target files for each migration execution time period; and one or more file systems 3105 which are migration targets.

The disk array apparatus 3400 is configured as a second storage apparatus having a plurality of volumes 3401 for storing files on the file systems 3105 and each volume 3401 exists for each file system 3105.

Under this circumstance, each volume 3401 functions as a second logical volume constituting a logical storage area of a storage device and the CPU 3200 functions as a second controller for controlling data input/output processing on the plurality of file systems 3105 constructed on each volume 3401. As storage devices, for example, an SSD (Solid State Drive) which is a high-speed, small-capacity storage device can be used. As the storage devices, for example, SAS (Serial Attached SCSI) Disks, SATA (Serial ATA) Disks, or FC (Fibre Channel) Disks which are low-speed, large-capacity storage devices can be used.

The plurality of file systems 3105 constructed on each volume 3401 are integrated with the plurality of file systems 2401 constructed on each volume 2401 in the disk array apparatus 2400; and the integrated file system is a hierarchical file system, which is virtually hierarchized, and is provided as an access target for access requestors to a computer(s) and a user terminal(s) (either of them are not shown in the drawing) connected to the network 111.

Figure 4:
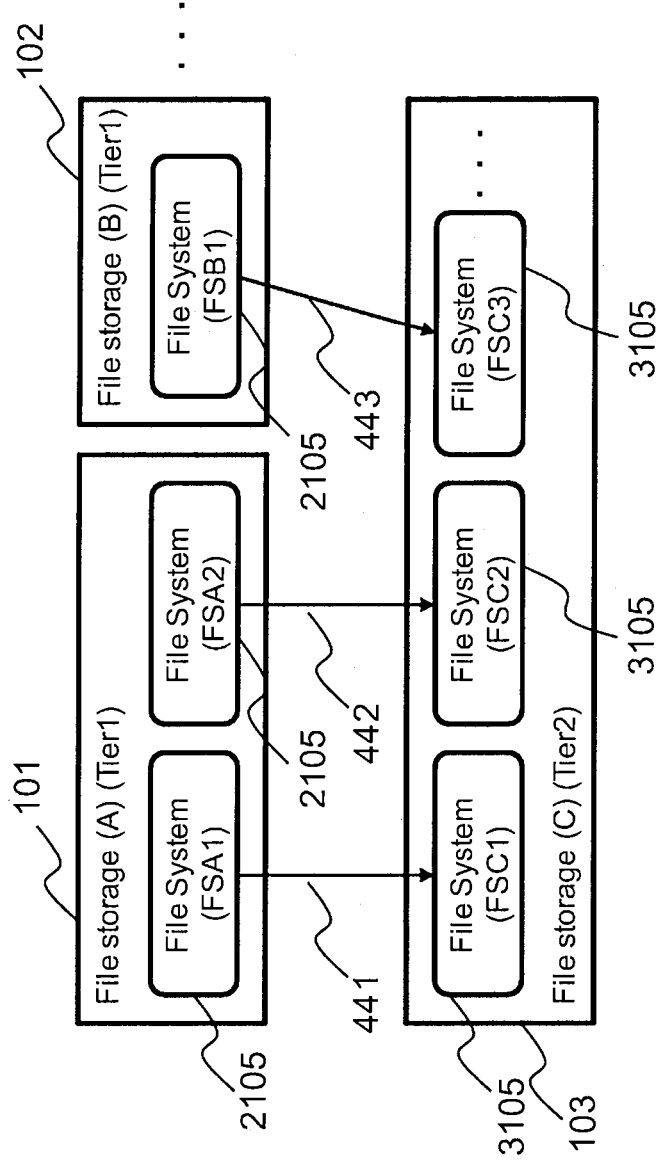
FIG. 4 is a schematic illustration explaining migrations executed between file systems in Tier 1 and Tier 2.

FIG. 4 is a schematic illustration explaining the relationship between the plurality of file systems when file migrations are executed between the file storage apparatuses for Tier 1 and the file storage apparatus for Tier 2.

FIG. 4 shows an example in which a first file system is a file system FSA1 and a second file system is FSA2 from among the file systems 2105 belonging to the file storage apparatus (A) 101 for Tier 1, a first file system is a file system FSB1 from among the file systems 2105 belonging to the file storage apparatus (B) 102, and a first file system is a file system FSC1, a second file system is a file system FSC2, and a third file system is a file system FSC3 from among the file systems 3105 belonging to the file storage apparatus (C) 103 for Tier 2.

Under this circumstance, the migration engine 2108 executes processing, as migration tasks, for selecting migration source file systems as migration targets from the plurality of file systems 2105, selecting migration destination file systems as migration targets from among the plurality of file systems 3105, and migrating files belonging to the migration source file systems to the migration destination file systems.

Specifically speaking, the migration engine 2108 executes a file migration 441 from the file system FSA1 to the file system FSC1, a file migration 442 from the file system FSA2 to the file system FSC2, and a file migration 443 from the file system FSB1 to the file system FSC3 between Tier 1 and Tier 2.

Figure 5:
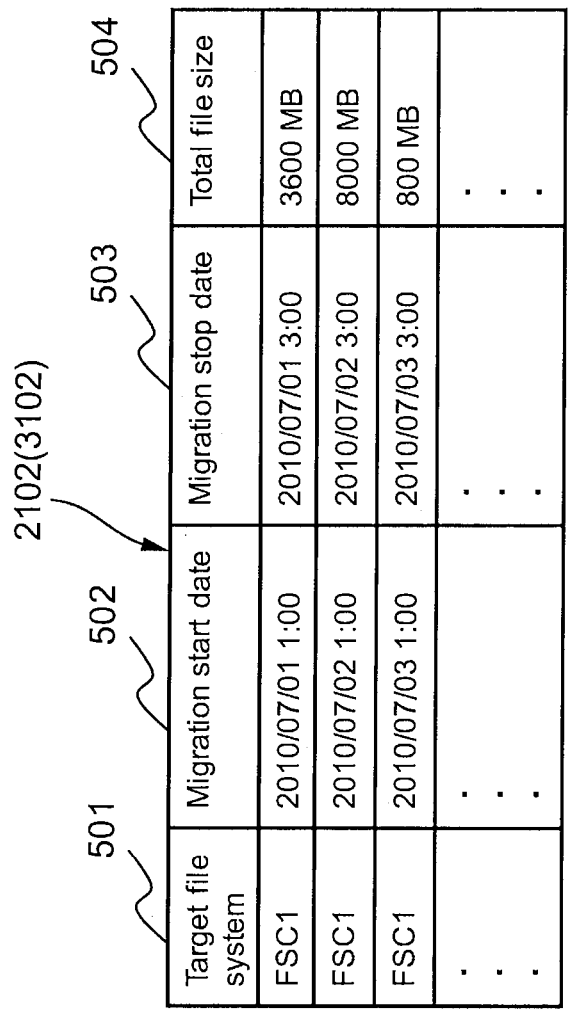
FIG. 5 is a configuration diagram showing an example of a migration task list.

FIG. 5 is a configuration diagram showing an example of the migration task list 2102, 3102 retained by the file storage apparatuses 101, 102, 103. Since the migration task lists 2102 and 3102 have the same configuration, the configuration of the migration task list 2102 will be explained below.

The migration task list 2102 includes: a target file system 501 indicating a file system which is a migration destination; a migration start date 502; migration stop date 503; and the total file size 504 of the relevant migration target file.

The target file system 501 column in the migration task list 2102 stores the name, such as FSC1, of the file system 3105 which is a migration destination of the file system 2105 belonging to the file storage apparatus 101, 102.

The migration start date 502 column stores information about migration start time together with information about a migration start date and the migration stop time 503 column stores information about migration stop time together with a migration stop date.

The total file size 504 column stores the total file size of the relevant migration target file, such as 3600 MB, 8000 MB, and 800 MB.

Figure 6:
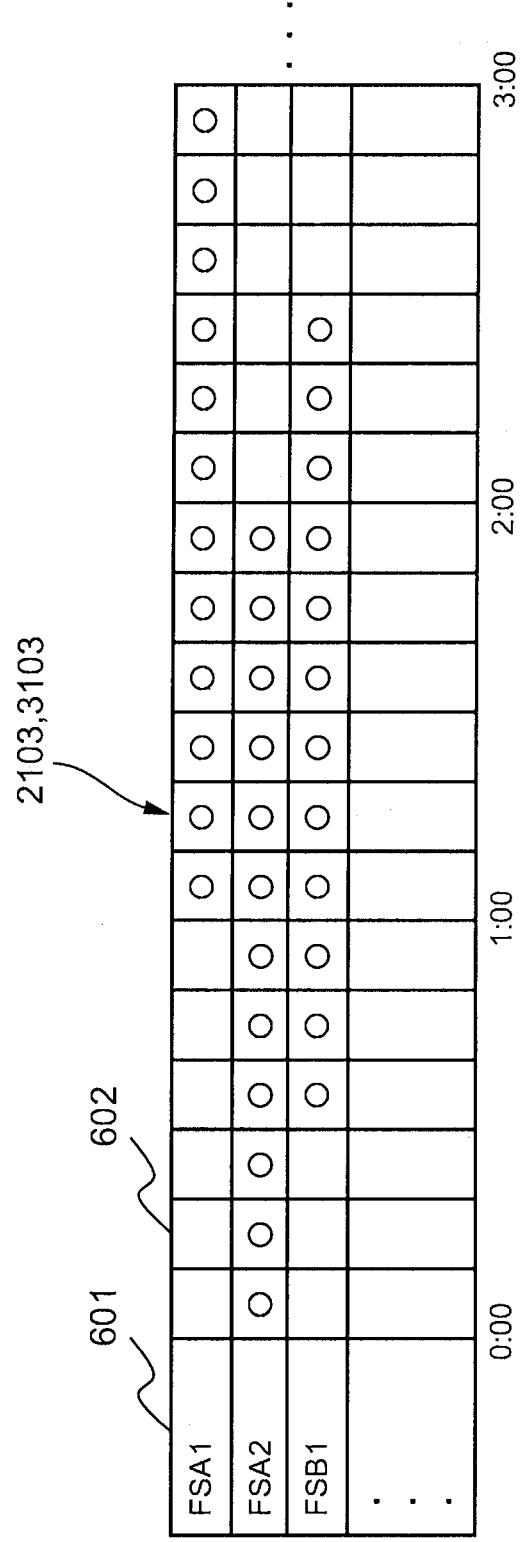
FIG. 6 is a configuration diagram showing an example of a migration overlap list.

FIG. 6 is a configuration diagram showing an example of the migration overlap table 2103, 3103. Incidentally, since the migration overlap tables 2103 and 3103 have the same configuration, the configuration of the migration overlap table 2103 will be explained below.

Referring to FIG. 6, the migration overlap table 2103 includes a migration source file system name 601 and a migration schedule column 602 indicating, for each unit time, whether the execution of a migration is scheduled or not.

The migration source file system name 601 in the migration overlap table 2103 stores a migration source file system name, such as FSA1 and FSA2 as the names of the file systems 2105 belonging to the file storage apparatus 101 or FSB1 as the name of the file system 2105 belonging to the file storage apparatus 102.

Based on information about time periods from the migration start time to the migration stop time as described in the migration task list 2102, 3102, the migration schedule column 602 stores a check mark if the execution of a migration is scheduled for each unit time; and the migration schedule column 602 stores no mark if the execution of a migration is not scheduled.

The CPU 2200, 3200 can recognize to what degree migrations to be executed overlap with each other, by recording the scheduled time periods for the migrations to be executed with regard to all the file systems, which are migration sources, in the migration overlap table 2103. Incidentally, the unit time is set to 10 minutes in this embodiment; however, longer or shorter unit time may be set according to the accuracy of required predictions.

FIG. 7 is a configuration diagram showing an example of the remaining file size table 2104, 3104. Incidentally, since the remaining file size tables 2104 and 3104 have the same configuration, the configuration of the remaining file size table 2104 will be explained below.

Referring to FIG. 7, the remaining file size table 2104 is composed of: time 701 counted every unit time; a data transfer amount 702 indicating a data amount that can be transferred at each file system (FSA1, FSA2, FSB1); and a remaining file size 703 indicating the total remaining size of migration target files at each file system (FSA1, FSA2, FSB1).

A data transfer rate at the time of a migration is determined according to, for example, a bandwidth and the status of the network 111 and service standards guaranteed by the QoS (Quality of Service) or is estimated based on a performance log recorded at the time of execution of migrations in the past (the migration performance log 2109); and the data transfer rate is assumed as 1 MB/sec in this embodiment.

Furthermore, the unit time is assumed as 10 minutes. As a result, the data transfer amount 702 for the unit time of 10 minutes is 600 MB.

Also, it is assumed in this embodiment that during a time period when a plurality of migrations are executed, the amount of data to be transferred is divided equally into the migration tasks. Therefore, during a time period when two migration tasks are executed, the data transfer amount 702 of each file system is 300 MB.

The remaining file size 703 at the beginning of a migration is a value obtained based on the migration start time 502 and the total file size 504 in the migration task list 2102 in FIG. 5. Incidentally, values of the data transfer amount 702 and the remaining file size 703 are recorded in the remaining file size table 2104 as predicted values used when migrations by the migration engine 2108 are executed.

For example, in a case of the file system FSA2, a value of the remaining file size 703 at the beginning of a migration (0:00) is 4200 MB; in a case of the file system FSA1, a value of the remaining file size 703 at the beginning of the migration (1:00) is 3600 MB; and in a case of the file system FSB1, a value of the remaining file size 703 at the beginning of the migration (0:30) is 1200 MB.

A value obtained by subtracting the data transfer amount 702 for the relevant time period from the above-mentioned value is the remaining file size of the next time period.

For example, in the case of the file system FSA2, a value 3600 MB obtained by subtracting the data transfer amount 702, which is 600 MB, from the remaining file size 703 at the beginning of the migration (0:00), which is the value 4200 MB, is the remaining file size for the next time period (0:10).

Similarly, the remaining file size 703 of the next time period (0:20) is 3000 MB and the remaining file size 703 for the next time period (0:30) is 2400 MB.

However, in and after the time period 0:30, the migration of the file system FSA2 overlaps with the migration of other file system FSB1 or file system FSA1. Therefore, the remaining file size 703 changes according to the value of the data transfer amount 702.

In the case of the file system FSB1, a value 900 MB obtained by subtracting the data transfer amount 702, which is 300 MB, from the remaining file size 703 at the beginning of the migration (0:30), which is 1200 MB, is the remaining file size for the next time period (0:40).

In this case, the migrations of the file system FSB1 and the file system FSA2 overlap with each other in and after the time period (0:30) which is the beginning of the migration of the file system FSB1. So, the entire data transfer amount 600 MB is divided equally into two halves, so that the data transfer amount 702 of each of the file system FSB1 and the file system FSA2 is 300 MB. Therefore, in the case of the file system FSA2, the remaining file size 703 for the next time period (0:40) at time 0:30 is 2400 MB−300 MB=2100 MB.

In the case of the file system FSA1, a value 3400 MB obtained by subtracting the data transfer amount 702, which is 200 MB, from the remaining file size 703 at the beginning of the migration (1:00), which is a value 3600 MB, is the remaining file size for the next time period (1:10).

In this case, migrations of the file system FSB1, the file system FSA2, and the file system FSA1 in and after the time period (1:00) which is the beginning of the migration of the file system FSA1 overlap with each other, the entire data transfer amount 600 MB is divided equally into three parts and the data transfer amount 702 of each of the file system FSB1, the file system FSA2, and the file system FSA1 is 200 MB.

As a result, in the case of the file system FSA2, the remaining file size 703 for the next time period (1:10) at time 1:00 is 1500 MB−200 MB=1300 MB. In the case of the file system FSB1, the remaining file size 703 for the next time period (1:10) at time 1:00 is 300 MB−200 MB=100 MB.

The details of the calculation method for the remaining file size tables 2104 and 3104 will be described later with reference to the flowcharts in FIG. 11 and FIG. 12.

Figure 8:
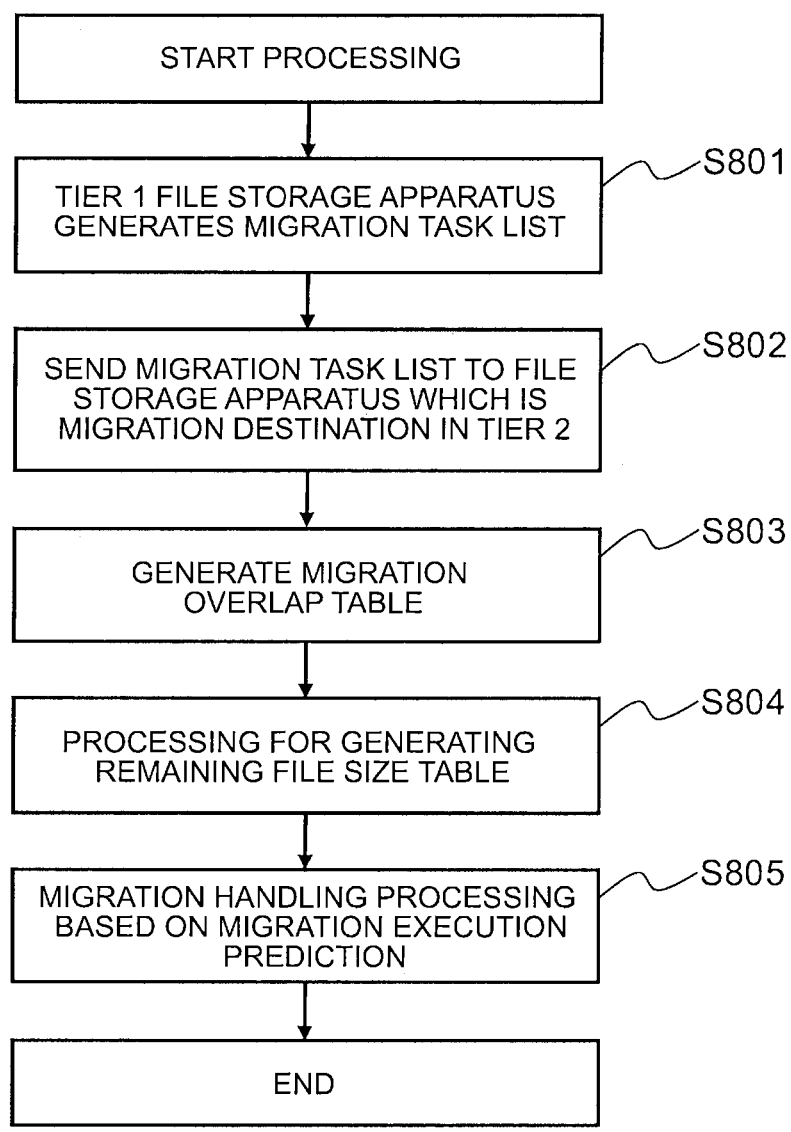
FIG. 8 is a flowchart illustrating the overall processing according to the first embodiment.

FIG. 8 is a flowchart illustrating a flow of the overall processing according to this embodiment.

The pre-migration processor 2101 for each file storage apparatuses 101, 102 for Tier 1 generates the migration task list 2102 based on, for example, information from a user terminal (not shown in the drawings) connected to the network 111 (information including a migration target file, the name of a target file system which is a migration destination, migration start time, and migration stop time) (S801) and sends the generated migration task list 2102 via the network 111 to the file storage apparatus 103 for Tier 2 before the execution of a migration by the migration engine 2108 (S802).

All the file storage apparatuses 101, 102 for Tier 1 send the migration task lists 2102 to the file storage apparatus 103 for Tier 2 which is the migration destination; and the file storage apparatus 103 for Tier 2 retains the received migration task lists 2102 as the migration task lists 3102.

The pre-migration processor 3101 for Tier 2 generates the migration overlap table 3103 based on the migration start time 502 and the migration stop date 503 described in the migration task lists 3102 (S803).

Next, the pre-migration processor 3101 for Tier 2 executes processing for generating the remaining file size table 3104 based on the generated migration overlap table 3103 and the information in the retained migration task lists 3102 (S804). The details of this processing will be explained with reference to the flowcharts in FIG. 9 and FIG. 10.

Subsequently, the pre-migration processor 3101 for Tier 2 predicts, based on the information in the generated remaining file size table 3104, whether the migration execution will be successful or not; and executes countermeasure processing based on this prediction result (S805). The details of this processing will be explained with reference to the flowchart in FIG. 11.

Figure 9:
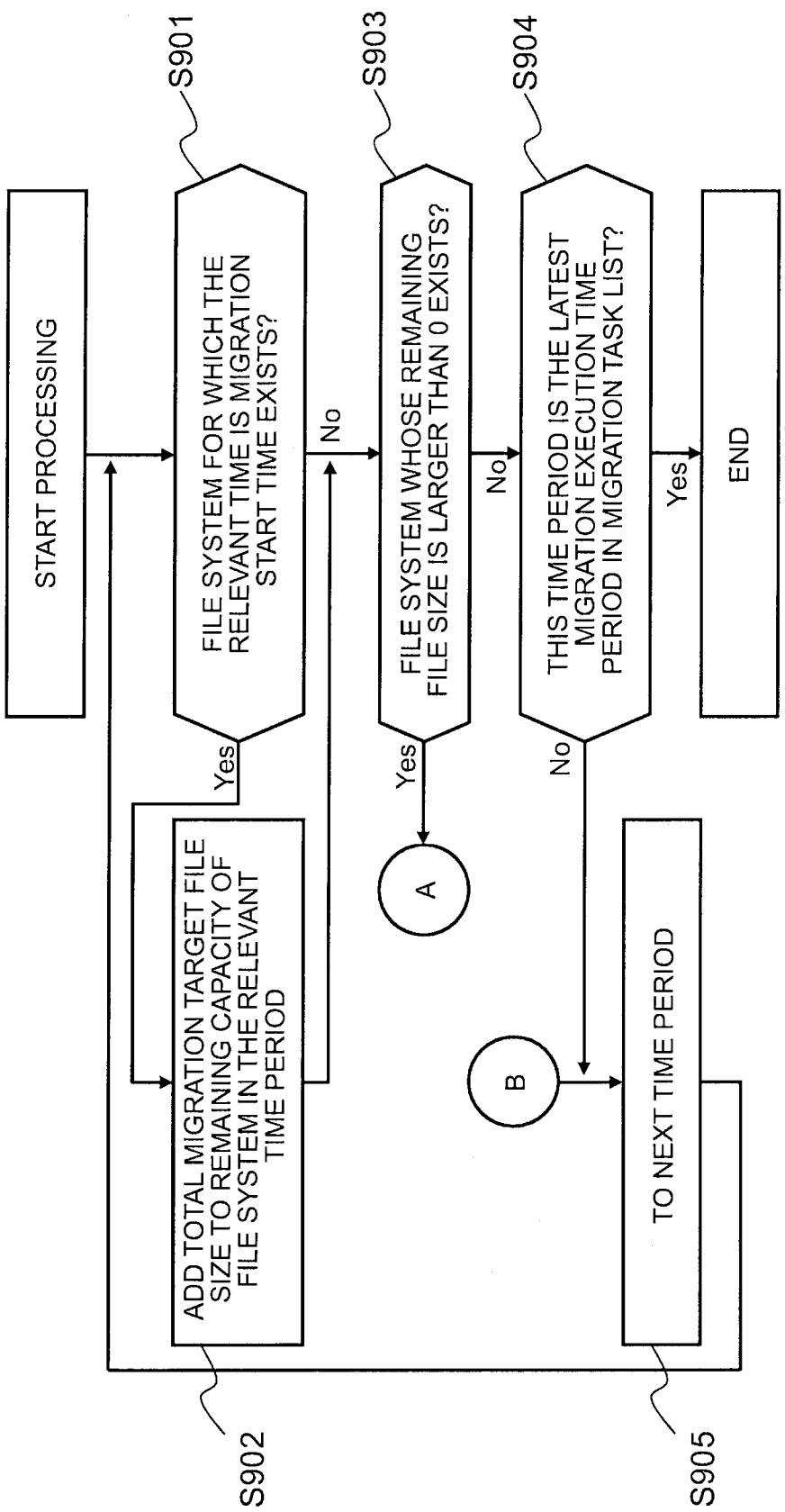
FIG. 9 is a flowchart illustrating processing for generating the remaining file size table.
Figure 10:
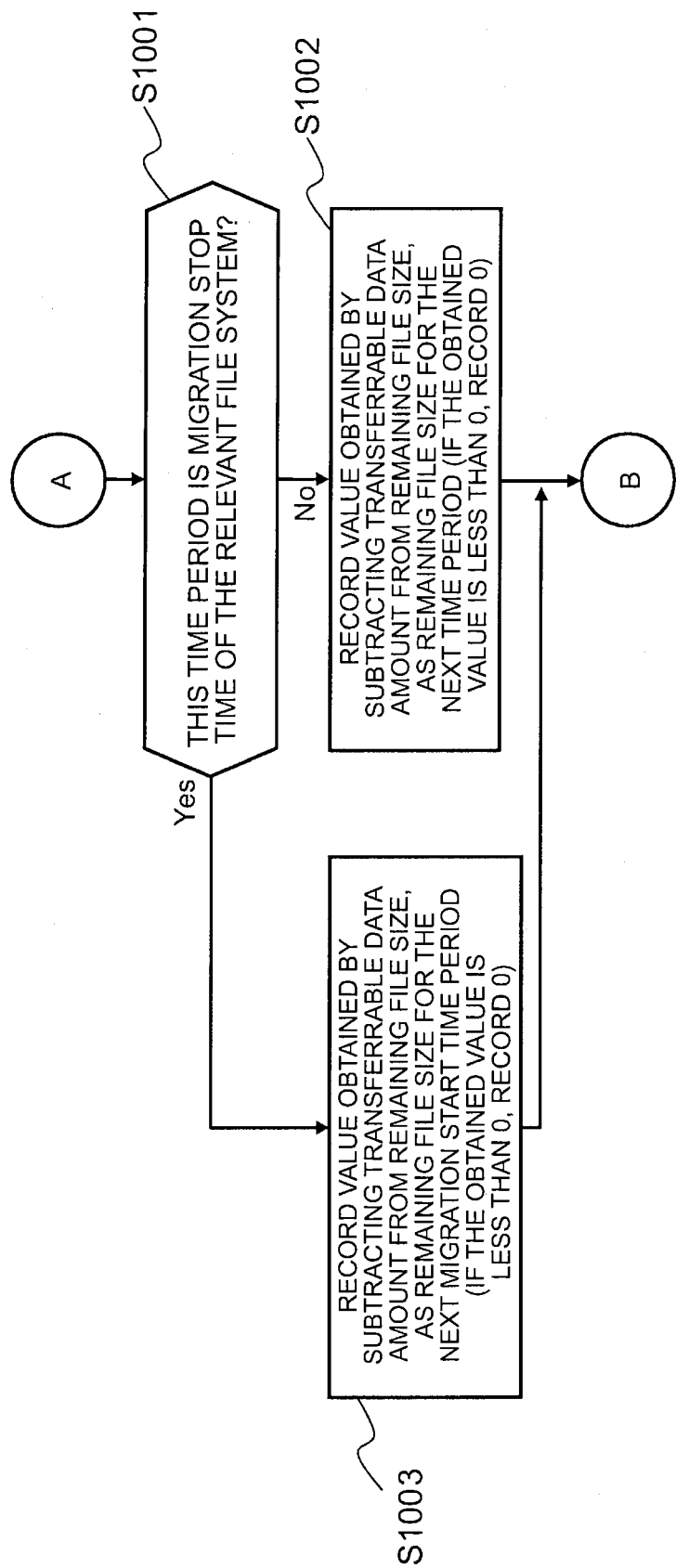
FIG. 10 is a flowchart illustrating processing for generating the remaining file size table.

FIG. 9 and FIG. 10 are flowcharts illustrating a flow of processing for generating the remaining file size table.

The pre-migration processor 3101 for Tier 2 executes processing for generating the remaining file size table 3104 every unit time (every 10 minutes in this embodiment) sequentially from scheduled time for the execution of the first migration.

The pre-migration processor 3101 for Tier 2 firstly judges whether a file system whose migration start time is the time recorded in the migration overlap table 3103 exists or not (S901).

If it is determined in step S901 that such a file system exists (S901: Yes), the pre-migration processor 3101 for Tier 2 registers the total file size (the value described in the total file size 504 in the migration task list 3102) of the migration target files to the remaining file size 703 for the relevant time period in the remaining file size table 3104 (S902).

For example, if the migration target file is the file system FSA2 and the relevant time is 0:00, the pre-migration processor 3101 for Tier 2 registers 4200 MB as the remaining file size 703 at time 0:00 in the remaining file size table 3104.

Next, if it is determined in step S901 that the above-described file system does not exist (S901: No) or after the processing in step S902, the pre-migration processor 3101 for Tier 2 judges whether or not a file system whose remaining file size at the time recorded in the migration overlap table 3103 is larger than 0 exists (S903).

If it is determined in step S903 that such a file system exists (S903: Yes), the pre-migration processor 3101 for Tier 2 judges whether or not this time period is the migration stop time of the relevant file system (S1001).

If this time period is the migration stop time of the relevant file system and all the migrations of the relevant files have not been completed yet, the migration of that file system will not be executed until the next opportunity. So, the migrations of the remaining files will be carried over to the next time.

Therefore, if it is determined in step S1001 that this time period is the migration stop time for the relevant file system, the pre-migration processor 3101 for Tier 2 subtracts the data transfer amount 702 from the total value of the remaining file size 703 and records the obtained value in the migration start time field for the next time (S1003).

If the value obtained by subtracting the data transfer amount 702 from the total value of the remaining file size 703 is larger than 0, the value larger than 0 is recorded in the migration start time field for the next time. Incidentally, if the value obtained by subtracting the data transfer amount 702 from the total value of the remaining file size 703 is 0 or less than 0, 0 is recorded in the migration start time field for the next time.

On the other hand, if the file system for which the time recorded in the migration overlap table 3103 is the migration stop time does not exist (S1001: No), the migration will be made to continue in the immediately following time period. So, the pre-migration processor 3101 for Tier 2 records the value obtained by subtracting the data transfer amount 702 from the total value of the remaining file size 703, as the remaining file size 703 for the next time period in the remaining file size table 3104 (S1002).

For example, in the case of the file system FSA2, the value 3600 MB obtained by subtracting the data transfer amount 702, which is 600 MB, from the remaining file size 703 at the beginning of the migration (0:00), which is 4200 MB, as the remaining file size for the next time period (0:10).

Subsequently, the pre-migration processor 3101 for Tier 2 repeats the processing for the next time period (S905).

If the file system for which the value of the remaining file size 703 is larger than 0 does not exist in S903 (S903: No), the pre-migration processor 3101 for Tier 2 judges whether or not the relevant time period is the latest time period in the migration task list 3102 (S904).

If it is determined in step S904 that the relevant time period is not the latest time period in the migration task list 3102 (S904: No), the pre-migration processor 3101 for Tier 2 repeats the processing for the next time period (S905).

If it is determined in step S904 that the relevant time period is the latest time period in the migration task list 3102 (S904: Yes), the pre-migration processor 3101 for Tier 2 predicts that the migration execution has terminated within the scheduled time period and the migration has been executed successfully; and then terminates the processing in this routine.

Figure 11:
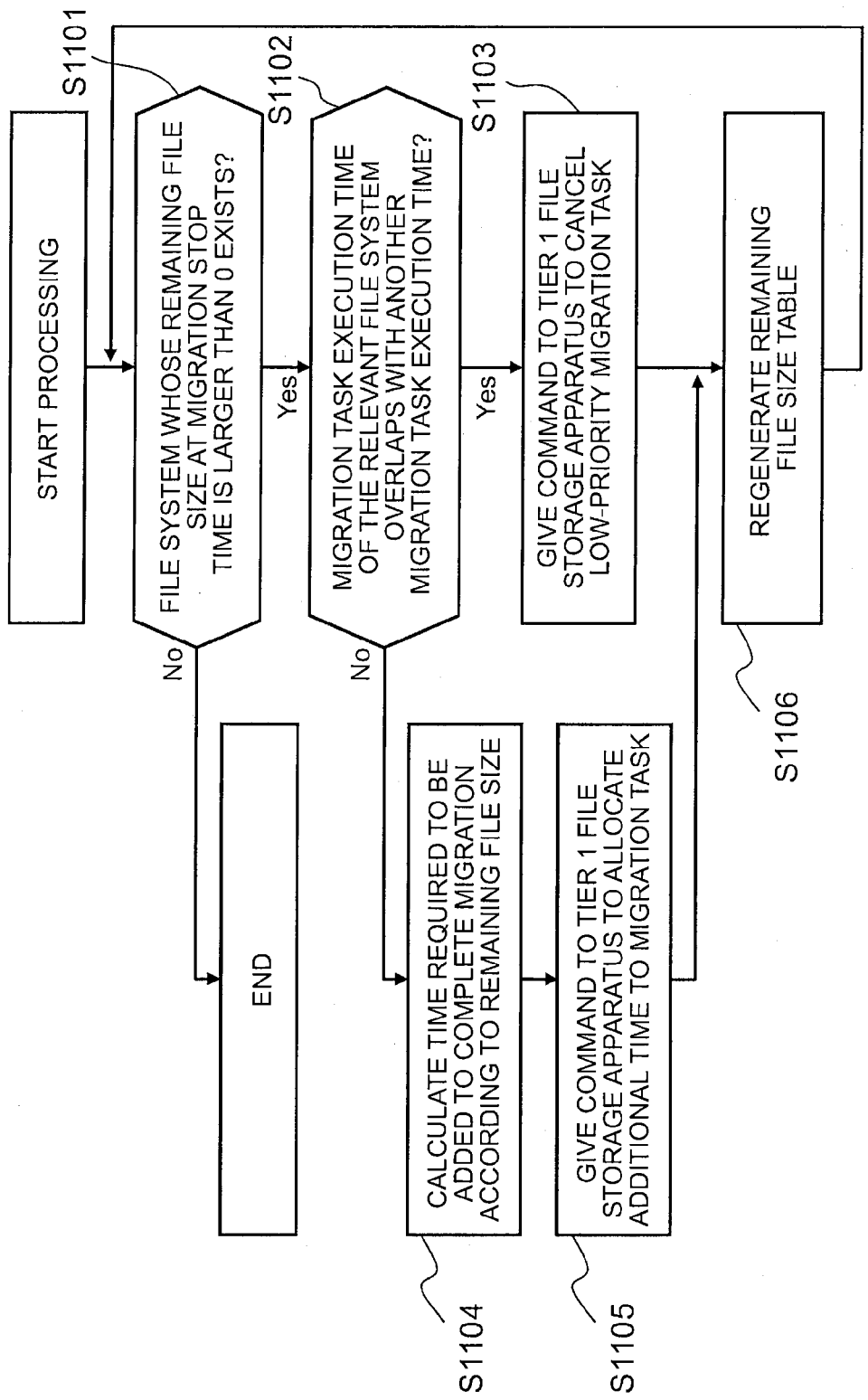
FIG. 11 is a flowchart illustrating processing for predicting whether the migration execution will be successful or not.

FIG. 11 is a flowchart illustrating a flow of the countermeasure processing based on the migration execution prediction.

The pre-migration processor 3101 firstly judges, based on the generated remaining file size table 3104, whether a file system whose remaining file size at the migration stop time is larger than 0 exists or not (S1101).

If it is determined in step S1101 that such a file system does not exist (S1101: No), the pre-migration processor 3101 terminates the processing; and if it is determined in step S1101 that such a file system exists (S1101: Yes), the pre-migration processor 3101 judges whether or not the migration execution time periods for the relevant file system overlap with those of other file systems (S1102).

If it is determined in step S1101 that the migration execution time periods for the relevant file system overlap with those of other file systems (S1102: Yes), the pre-migration processor 3101 gives a command to the file storage apparatus 101 or 102 for Tier 1 to stop the execution of a low-priority migration task(s) from among the overlapping migration tasks in order to reduce the load imposed by the overlapping migrations (S1103).

As the priorities in this case, for example, priorities between the file sharing services 2106 as set by the user or priorities set with regard to the remaining capacity of the file systems can be used. In the latter case, it is possible to set a high priority to the file system with a small remaining capacity.

Cessation of the migration tasks can be automatically executed in the order of low-priority migration tasks. It is possible to adopt a method of having the user select the migration task(s) to be stopped, by displaying, on a screen, information about the degree of how the migration execution time periods overlap with each other, and the capacity of the file systems.

Subsequently, the pre-migration processor 3101 generates the remaining file size table 3104 in which the cessation of the migration task(s) is reflected (S1106); and then returns to step S1101 and repeats the processing.

On the other hand, if the migration execution time periods do not overlap with each other, there is a possibility that the migration execution time may be short as compared to the amount of the migration target files. So, it is necessary to increase the migration execution time in order to complete the migration.

Therefore, if it is determined in S1102 that migration execution time periods do not overlap with each other (S1102: No), the pre-migration processor 3101 calculates how much time needs to be added to the migration execution time, based on the remaining file size 703 at the migration stop time and the predicted data transfer amount 702 (S1104).

Specifically speaking, the pre-migration processor 3101 calculates time (additional time) to be extended as the migration execution time, based on the remaining file size 703 at the migration stop time and the predicted data transfer amount 702.

Subsequently, the pre-migration processor 3101 gives a command to the file storage apparatus 101 or 102 for Tier 1 to add the execution time to the migration task (S1105).

When adding the execution time to the migration task, the file storage apparatus 101 or 102 may automatically add time periods, in which other migration tasks are not executed, as the additional time or the user may decide the additional time period by displaying, on the screen, the time required to be added and the degree of how the migration task overlaps with other migration tasks.

Figure 12:
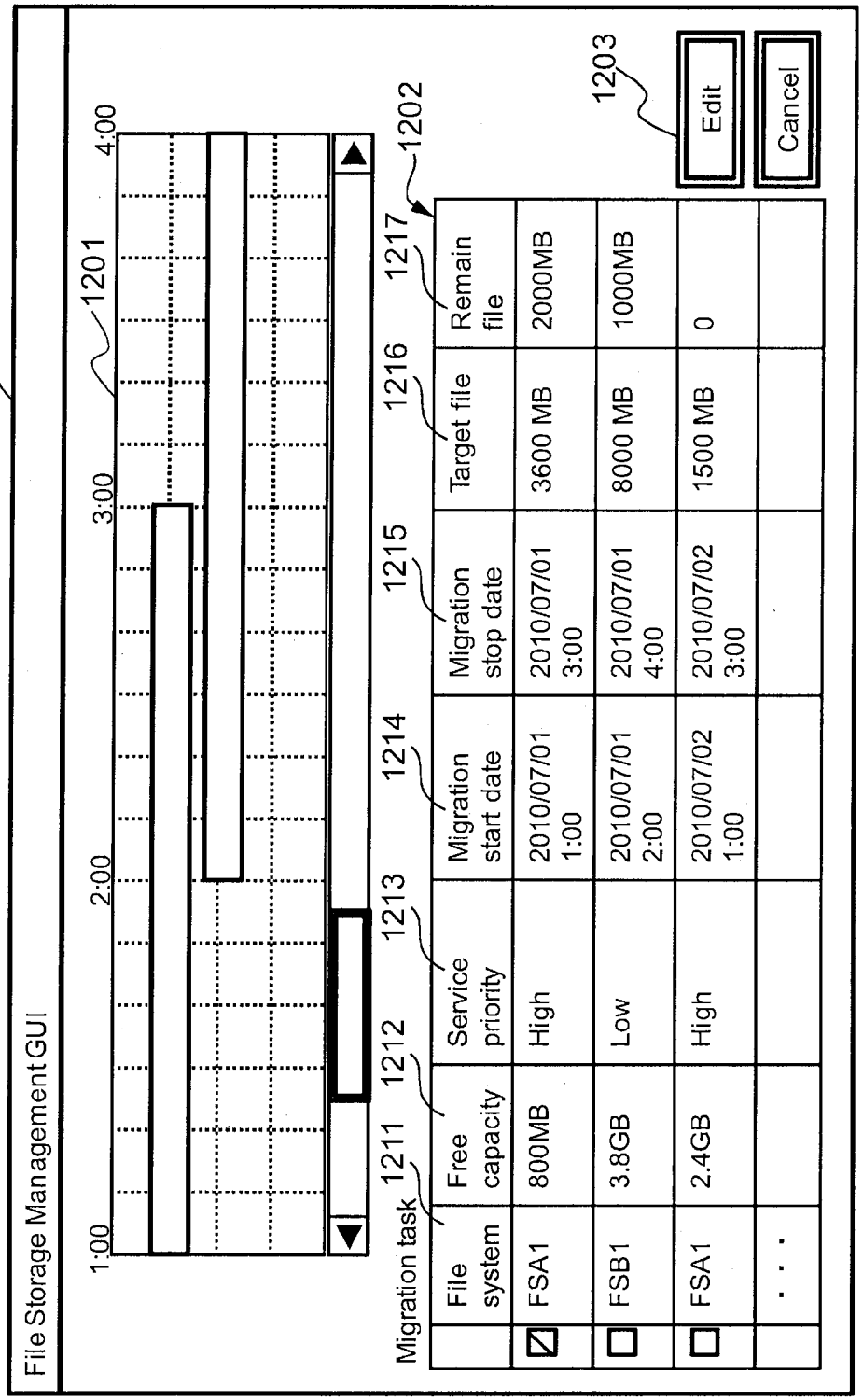
FIG. 12 is a configuration diagram showing an example of a GUI screen capable of displaying the result of the migration execution prediction and operations relating thereto.

Next, FIG. 12 shows an example of a GUI screen which displays information about the cessation of migrations and addition of time periods and to which the user can enter settings.

Referring to FIG. 12, a GUI screen 1200 for a user terminal connected to the network 111 includes: an area 1201, in which time periods for migrations to be executed at each file system are expressed in a band graph, an area 1202 in which information about migration tasks scheduled to be executed is displayed in a table, and buttons 1203 for the user to change the migration execution time periods or stop the task(s).

The area 1202 displays information such as a file system name 1211, its free capacity 1212, a file sharing service priority 1213, migration start time 1214, migration stop time 1215, target file size 1216, and the remaining file amount when the migration is stopped 1217.

The user can check the result of the migration execution prediction through this GUI screen 1200 and perform the operation according to the migration execution prediction result.

In this embodiment, the migration task list 2102 is generated with regard to each of the plurality of file systems (FSA1, FSA2, FSB1) existing in the plurality of file storage apparatuses 101, 102 for Tier 1 and the migration task lists 2102 are sent to the file storage apparatus 103 for Tier 2 before file migrations are executed by the migration engine 2108 between the plurality of file systems (FSA1, FSA2, FSB1) in the plurality of file storage apparatus 101, 102 for Tier 1 and the plurality of file systems (FSC1, FSC2, FSC3) in the file storage apparatus 103 for Tier 2.

The pre-migration processor 3101 for Tier 2 generates the migration overlap table 3103, which shows the degree of how migrations overlap with each other, and the remaining file size table 3104, which shows the amount of data to be migrated by the execution of migration, based on each of the received migration task lists 2102; and can predict whether the migration execution by the migration engine 2108 will be successful or not, based on the information in the generated migration overlap table 3103 and remaining file size table 3104.

For example, the pre-migration processor 3101 judges, with regard to each migration source file system, whether the predicted value for the last scheduled time period of the scheduled time periods for the migration execution, from among the predicted values of the remaining file size 703 for each unit time as recorded in the generated remaining file size table 3104, is larger than 0 or not; and if the predicted value for the last scheduled time period of the scheduled time periods for the migration execution is equal to or less than 0, the pre-migration processor 3101 can predict that the migration by the migration engine 2108 will be executed successfully; and if the predicted value for the last scheduled time period of the scheduled time periods for the migration execution is larger than 0, the pre-migration processor 3101 can predict that the migration execution by the migration engine 2108 will fail.

Under this circumstance, if the pre-migration processor 3101 predicts that the migration execution by the migration engine 2108 will fail, and on condition that the scheduled time periods for the migration execution of the migration task for the file system, for which the failure of the migration execution by the migration engine 2108 is predicted, from among each of the migration source file systems, overlap with the scheduled time periods for the migration execution of a migration task(s) for another file system, the pre-migration processor 3101 gives a command to the migration engine 2108 to stop the execution of a low-priority migration task(s) from among the migration tasks belonging to the file systems which are the targets of the migration execution by the migration engine 2108.

Subsequently, the pre-migration processor 3101 updates the remaining file size table 3104 according to the content regarding which the command was given to the migration engine 2108; and can predict again whether the migration by the migration engine 2108 will be executed successfully or not, based on information recorded in the updated remaining file size table 3104.

Furthermore, the pre-migration processor 3101 can designate the migration task(s) belonging to a file system with large free capacity, from among each of the migration source file systems, as the low-priority migration task(s) from among the migration tasks belonging to the file systems which are the targets of the migration execution by the migration engine 2108.

Furthermore, if the pre-migration processor 3101 predicts that the migration execution by the migration engine 2108 will fail, and on condition that the scheduled time periods for the migration execution of the migration task for the file system, for which the failure of the migration execution by the migration engine 2108 is predicted, from among each of the migration source file systems, do not overlap with the scheduled time periods for the migration execution of a migration task(s) for another file system, the pre-migration processor 3101 calculates time required to be added as the scheduled time period in order to make the predicted value for the last scheduled time period of the scheduled time periods for the migration execution, from among the remaining file size 703 in the remaining file size table 3104 as recorded for the file system, for which the failure of the migration execution by the migration engine 2108 is predicted, become equal to or less than 0.

Subsequently, the pre-migration processor 3101 gives a command to the pre-migration processor 2101 to change the scheduled time periods for the migration execution based on the calculation result of the additional time, and updates the remaining file size table 3104 according to the calculation result of the additional time; and can predict again whether the migration by the migration engine 2108 will be executed successfully or not, based on information recorded in the updated remaining file size table 3104.

According to this embodiment, whether file migrations between the hierarchical file storage apparatuses will be executed successfully or not can be predicted accurately in advance.

Furthermore, according to this embodiment, the file storage apparatus 103 for Tier 2 can take measures for reducing the load, that is, to execute appropriate countermeasure processing based on the prediction result by giving the command to the migration source file storage apparatuses 101, 102 to execute processing for increasing the migration execution time or the processing for stopping the execution of part of the overlapping migration tasks based on the prediction result regarding whether the migration execution will be successful or not.

Second Embodiment

This embodiment is designed on the assumption that a plurality of file storage apparatuses for Tier 2 exist as migration destinations with respect to a plurality of file storage apparatuses for Tier 1; and whether the migration execution will be successful or not in that case is predicted.

Figure 13:
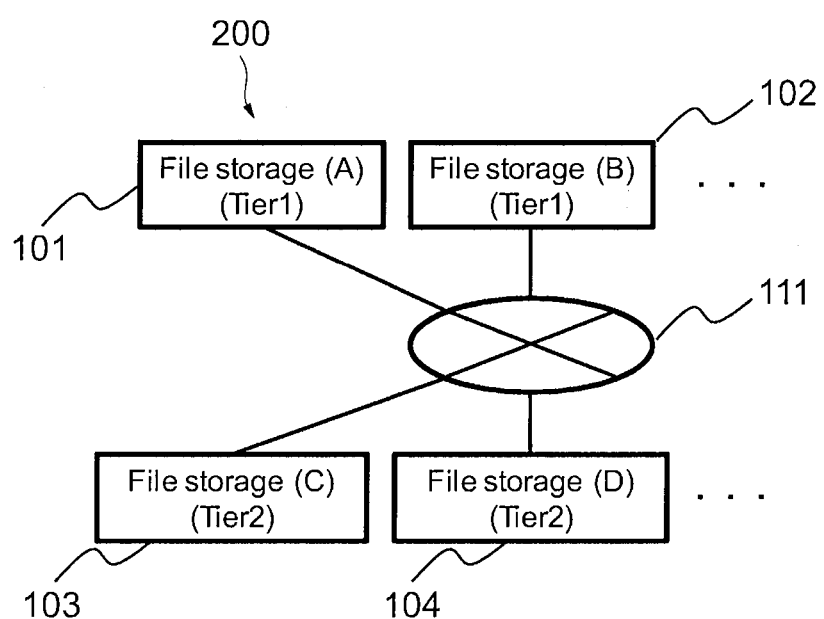
FIG. 13 is a configuration diagram of a storage system according to a second embodiment of the present invention.

FIG. 13 is a configuration diagram of a storage system according to this embodiment.

Referring to FIG. 13, a storage system 200 includes, as hierarchical file storage apparatuses, a file storage apparatus (A) 101 and a file storage apparatus (B) 102 that have storage devices belonging to a high-order tier (Tier 1); and a file storage apparatus (C) 103 and a file storage apparatus (D) 104 that have storage devices belonging to a low-order tier (Tier 2). The file storage apparatuses 101, 102, 103, 104 are connected to each other via the network 111.

The difference between the configuration of the storage system 200 according to this embodiment and the configuration of the first embodiment is that the plurality of file storage apparatuses 103, 104 exist as the file storage apparatuses constituting Tier 2. The file storage apparatus 104 has the same configuration as that of the file storage apparatus 103 and retains the migration task lists 3102, the migration overlap table 3103, and the remaining file size table 3104 as the file storage apparatus 103 does.

When migrations are executed from the single file storage apparatus 101 or 102 for Tier 1 to the plurality of file storage apparatus 103, 104 for Tier 2, a case where higher load is imposed on the file storage apparatus 101 or 102 for Tier 1 than on the file storage apparatuses 103, 104 for Tier 2 occurs.

Specifically speaking, when migrations are executed from the single file storage apparatus 101 or 102 for Tier 1 to the plurality of file storage apparatuses 103, 104 for Tier 2, even if the migrations do not overlap with each other in each file storage apparatus for Tier 2 on the basis of each file storage apparatus for Tier 2, the migrations may overlap with each other in the single file storage apparatus for Tier 1 on the basis of the single file storage apparatus for Tier 1.

Since the case where higher load is imposed on the file storage apparatus 101 or 102 for Tier 1 than on the file storage apparatuses 103, 104 for Tier 2 occurs, consideration is given to the load on the file storage apparatus 101 or 102 for Tier 1 in this embodiment.

Incidentally, in the first embodiment, whether the migration execution will be successful or not is predicted based on the load on the file storage apparatus 103 for Tier 2, that is, the degree of how the migrations overlap with each other when the migrations are executed from the plurality of file storage apparatuses 101, 102 for Tier 1 to the single file storage apparatus 103 for Tier 2.

Figure 14:
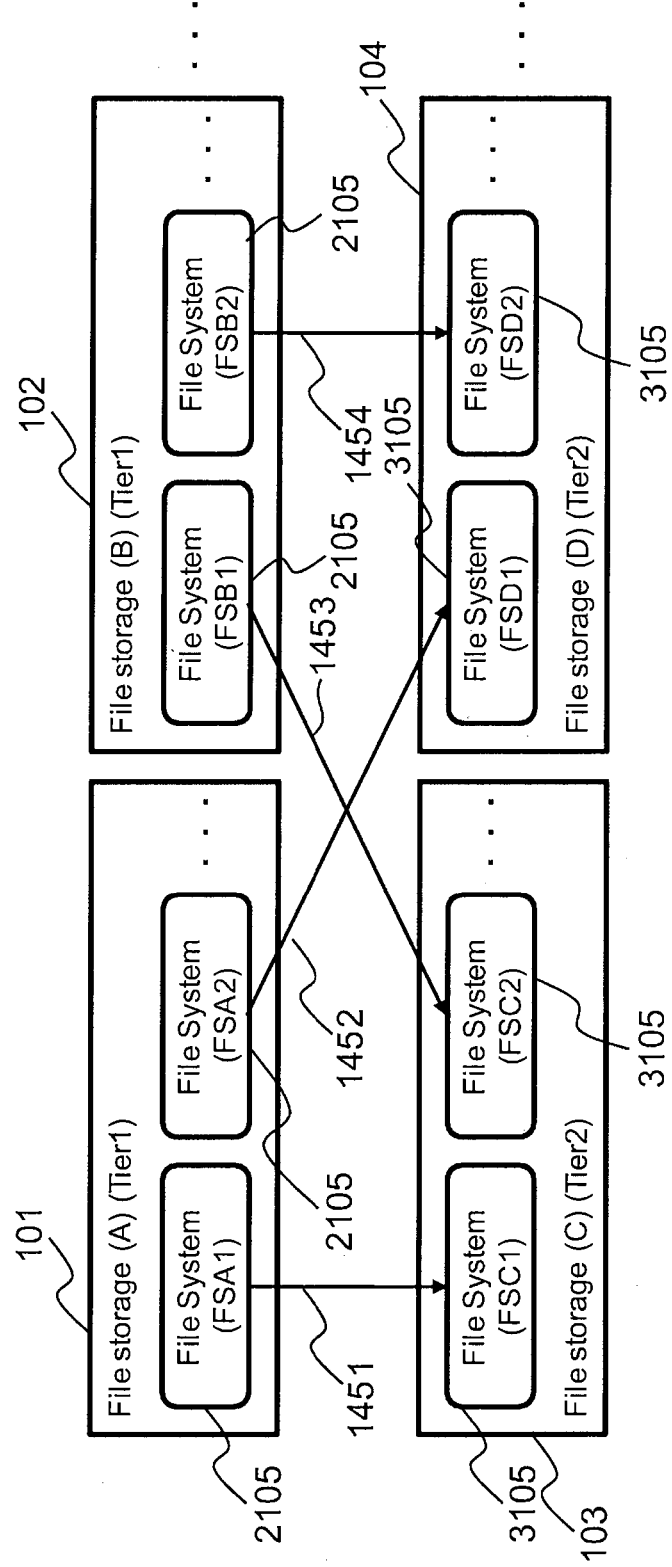
FIG. 14 is a schematic illustration for explaining migrations executed between the file systems in Tier 1 and Tier 2.

FIG. 14 is a schematic illustration explaining the relationship between the plurality of file systems when file migrations are executed between the file storage apparatuses for Tier 1 and the file storage apparatuses for Tier 2.

FIG. 14 shows an example in which a first file system is a file system FSA1 and a second file system is FSA2 from among the file systems 2105 belonging to the file storage apparatus (A) 101 for Tier 1, and a first file system is a file system FSB1 and a second file system is a file system FSB2 from among the file systems 2105 belonging to the file storage apparatus (B) 102, and a first file system is a file system FSC1 and a second file system is a file system FSC2 from among the file systems 3105 belonging to the file storage apparatus (C) 103 for Tier 2, and a first file system is a file system FSD1 and a second file system is a file system FSD2 from among the file systems 3105 belonging to the file storage apparatus (D) 104 for Tier 2.

Under this circumstance, the migration engine 2108 executes a file migration 1451 from the file system FSA1 to the file system FSC1, a file migration 1452 from the file system FSA2 to the file system FSD1, a file migration 1453 from the file system FSB1 to the file system FSC2, and a file migration 1454 from the file system FSB2 to the file system FSD2 between Tier 1 and Tier 2.

The overall processing according to this embodiment is similar to that shown in the flowchart in FIG. 8. However, while the processing in step S803 and S804 is executed by only the pre-migration processor 3101 for Tier 2 in the first embodiment, that processing is executed by both the pre-migration processor 2101 for Tier 1 and the pre-migration processor 3101 for Tier 2 in this embodiment.

This is because whether the migration execution will be successful or not is predicted in consideration of the load on the file storage apparatuses 103, 104 for Tier 1.

The content of the remaining file size table generation processing is similar to the processing shown in the flowcharts in FIG. 9 and FIG. 10.

In step S804 of the processing, both the pre-migration processor 2101 for Tier 1 and the pre-migration processor 3101 for Tier 2 generate the remaining file size tables 2104, 3104. Subsequently, both the pre-migration processor 2101 for Tier 1 and the pre-migration processor 3101 for Tier 2 predict, based on the generated remaining file size tables 2104, 3104, whether the migration execution will be successful or not; compare the prediction results; determines which is a bottleneck; and then modifies the remaining file size tables 2104, 3104. A flow of the processing is shown in the flowchart in FIG. 15.

Figure 15:
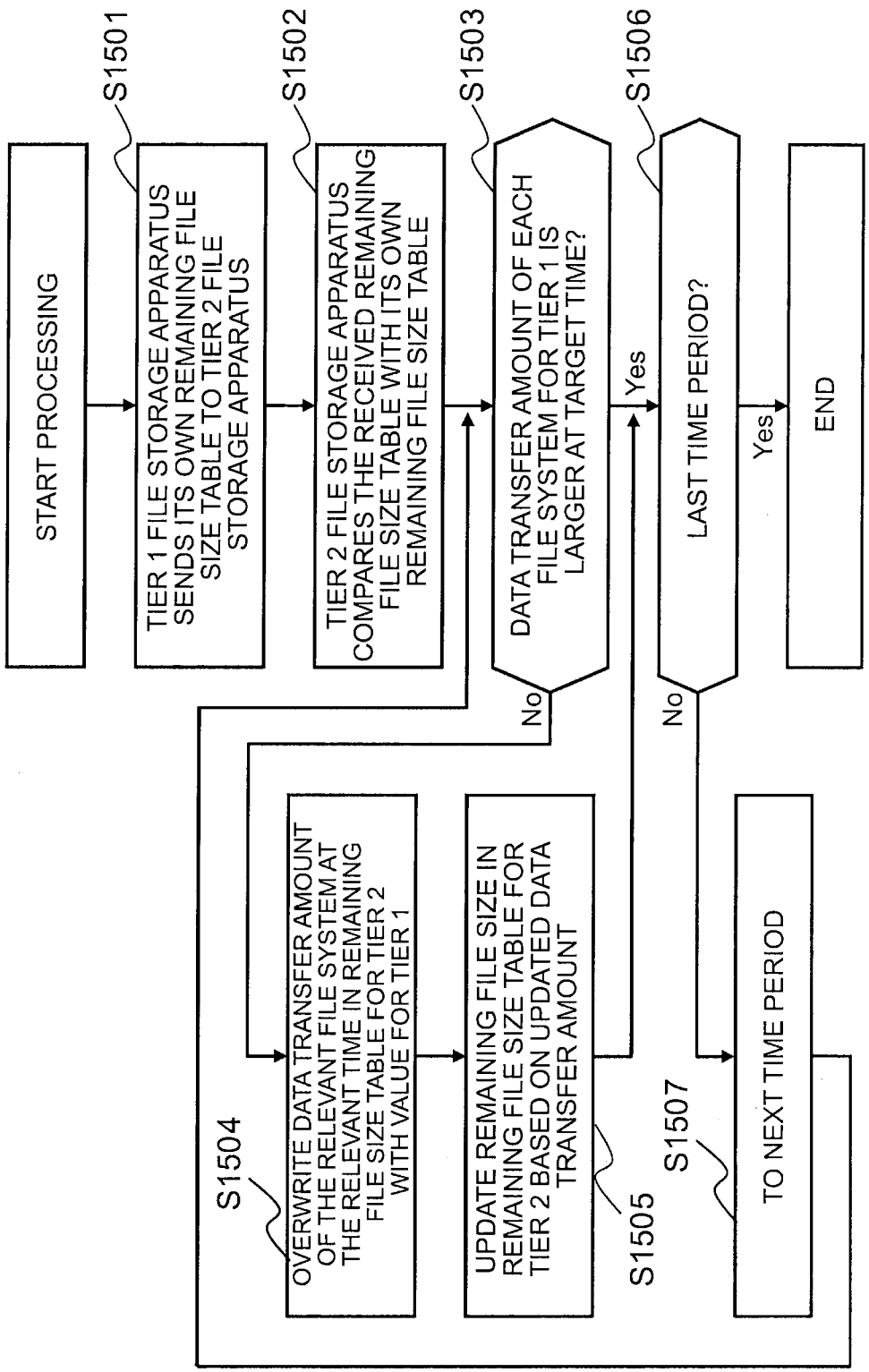
FIG. 15 is a flowchart illustrating processing for comparing the remaining file size tables for Tier 1 and Tier 2 and modifying the remaining file size table.

Referring to FIG. 15, for example, the pre-migration processor 2101 for the file storage apparatus 101 for Tier 1 sends the remaining file size table 2104 to the file storage apparatuses 103, 104 for Tier 2, which are migration destinations of the file systems FSA1, FSA2, respectively (S1501).

After receiving the remaining file size table 2104 from Tier 1, the pre-migration processor 3101 for the file storage apparatuses 103, 104 for Tier 2 compares the remaining file size table 2104 received from the file storage apparatus 101 for Tier 1 and the remaining file size table 3104, which it retains, with regard to each file system at each time (S1502).

Next, the pre-migration processor 3101 for Tier 2 judges, based on the comparison result at each time, whether or not the data transfer amount 702 for Tier 1 is larger than that for Tier 2 with regard to each file system (S1503).

If the data transfer amount 702 of the relevant file system for Tier 2 is larger than that for Tier 1, the load due to, for example, the overlapping migrations 1451, 1452 is imposed in the file storage apparatus 101 for Tier 1. Therefore, regarding the actual data transfer amount, the value on Tier 1 side is an accurate predicted value.

So, if it is determined in step S1503 that the data transfer amount 702 for the relevant file system for Tier 2 is larger than that for Tier 1 (S1503: No), the pre-migration processor 3101 for Tier 2 overwrites the data transfer amount 702 in the remaining file size table 3104 for Tier 2 with the data transfer amount 702 in the remaining file size table 2104 for Tier 1 (S1504).

Subsequently, the pre-migration processor 3101 for Tier 2 also updates the value of the remaining file size 703 in the remaining file size table 3104 for Tier 2 based on the value of the updated data transfer amount 702 (S1505).

Then, as in the case where it is determined in step S1503 that the data transfer amount 702 for the relevant file system for Tier 1 is larger than that for Tier 2 (S1503: Yes), the pre-migration processor 3101 for Tier 2 judges whether the comparison target time is the last time period or not (S1506). If the comparison target time is the last time period, the pre-migration processor 3101 for Tier 2 terminates the processing in this routine; and if the comparison target time is not the last time period, the pre-migration processor 3101 for Tier 2 sets the next time period as the comparison target (S1507) and repeats the processing from step S1503 to step S1506.

As a result of the above-described processing, whether the migration execution will be successful or not can be predicted in advance by reflecting the data transfer amount in the case where the load is concentrated on the file storage apparatus 101 for Tier 1.

After receiving this prediction result about whether the migration execution will be successful or not, it is possible to deal with the case where the failure of the migration execution is predicted due to the concentration of the load on the file storage apparatus 101 for Tier 1, by executing the prediction result countermeasure processing as shown in the flowchart in FIG. 11 in the same manner as in the first embodiment.

Furthermore, the user can obtain information appropriately and perform countermeasure operation based on the obtained information by using the GUI screen 1200 as shown in FIG. 12.

In this embodiment, the migration task list 2102 is generated with regard to each of the plurality of file systems (FSA1, FSA2, FSB1, FSB2) existing in the plurality of file storage apparatuses 101, 102 for Tier 1 and the migration task lists 2102 are sent to the file storage apparatuses 103, 104 for Tier 2 before file migrations are executed by the migration engine 2108 between the plurality of file systems FSA1, FSA2, FSB1, FSB2 in the plurality of file storage apparatus 101, 102 for Tier 1 and the plurality of file systems FSC1, FSC2, FSD1, FSD2 in the file storage apparatus 103 for Tier 2.

The file storage apparatuses 103, 104 for Tier 2 generate the migration overlap table 3103 and the remaining file size table 3104 based on the migration task lists 2102 sent from the plurality of file storage apparatuses 101, 102 for Tier 1; and at the same time, the file storage apparatuses 101, 102 for Tier 1 generate the migration overlap table 2103 and the remaining file size table 2104 and sends the generated migration overlap table 2103 and remaining file size table 2104 to the file storage apparatuses 103, 104 for Tier 2.

The file storage apparatuses 103, 104 for Tier 2 compare the remaining file size table 2104, which they generated, and the remaining file size table 3104 sent from the file storage apparatuses 101, 102 for Tier 1; and modify the remaining file size table 3104 based on this comparison result.

Specifically speaking, the pre-migration processor 2101 for Tier 1 generates, based on the generated migration task lists 2102, the migration overlap table 2103 which records, for each unit time, whether the migration execution by the migration engine 2108 is scheduled or not, with respect to each of the migration source file systems whose at least part of the scheduled time periods from among the scheduled time periods for the migration execution overlap with each other; and also generates, based on the migration overlap table 2103, the remaining file size table 2104 which records, for each of the migration source file systems, a predicted value of the data transfer amount 702 for each unit time and a predicted value of the remaining file size 703 for each unit time; and then transfer the generated remaining file size table 2104 to the pre-migration processor 3101 for Tier 2.

The pre-migration processor 3101 for Tier 2 compares the predicted value of the data transfer amount 702 for each unit time, which is recorded in the remaining file size table 2104, with the predicted value of the data transfer amount 702 for each unit time, which is recorded in the remaining file size table 3104; and on condition that the predicted value of the data transfer amount 702 which is recorded in the remaining file size table 3104 is larger than the predicted value of the data transfer amount 702 which is recorded in the remaining file size table 2104, the pre-migration processor 3101 for Tier 2 updates the predicted value of the data transfer amount 702, which is recorded in the remaining file size table 3104, with the predicted value of the data transfer amount 702 which is recorded in the remaining file size table 2104. As a result, the pre-migration processor 3101 for Tier 2 can predict, based on the updated remaining file size table 3104, whether the migration execution by the migration engine 2108 will be successful or not.

According to this embodiment, whether the migration execution will be successful or not can be predicted accurately in advance even in the circumstance where the load is concentrated on the file storage apparatuses 101, 102 for Tier 1; and it is possible to take measures for reducing the load by increasing the migration execution time or stopping the execution of part of the overlapping migration tasks, based on the above prediction result.

Third Embodiment

This embodiment is designed on the assumption that a single file storage apparatus for Tier 2 exists as a migration destination with respect to a plurality of file storage apparatuses for Tier 1 and a single file storage apparatus for Tier 3 exists as a migration destination with respect to the file storage apparatus for Tier 2; and whether the migration execution will be successful or not in that case is predicted.

In this embodiment, the file storage apparatus for Tier 2 which is located as an intermediate tier among the plurality of tiers serves as both a migration source and a migration destination.

Therefore, when predicting whether the migration execution will be successful or not, the degree of how migrations overlap with each other is calculated with regard to both the migrations executed with the file storage apparatus for Tier 1 as the migration source and the migrations executed with the file storage apparatus for Tier 2 as the migration source and consideration is given to the degree of load concentration based on this calculation result.

Figure 16:
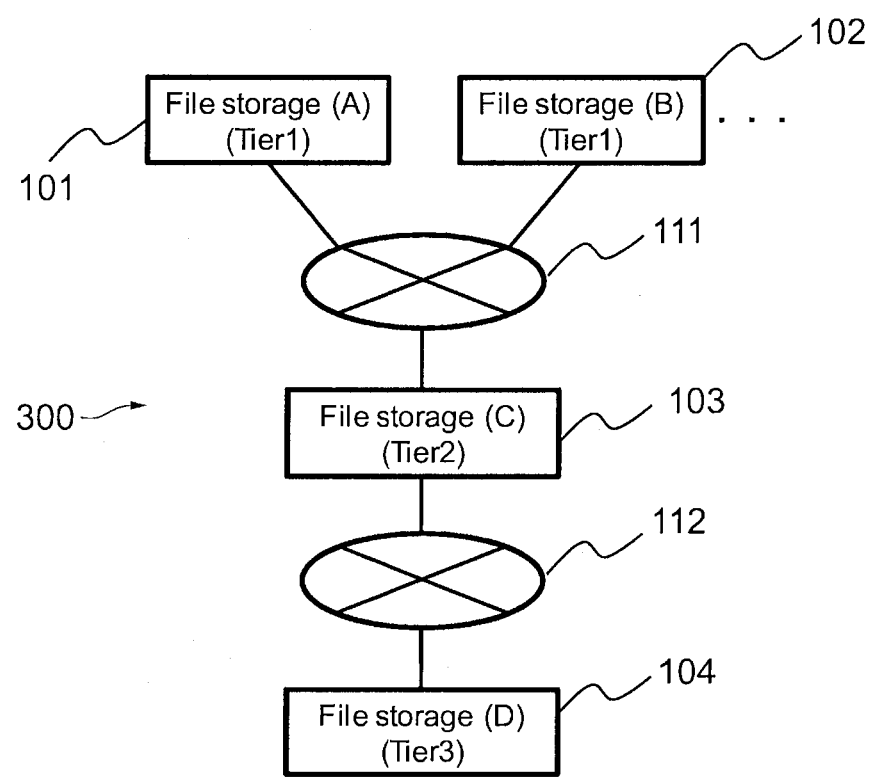
FIG. 16 is a configuration diagram of a storage system according to a third embodiment of this invention.

FIG. 16 is a configuration diagram according to this embodiment. Referring to FIG. 16, a storage system 300 includes, as hierarchical file storage apparatuses, a file storage apparatus (A) 101 and file storage apparatus (B) 102 that have storage devices belonging to a high-order tier (Tier 1), a file storage apparatus (C) 103 that has storage devices belonging to an intermediate-order tier (Tier 2), and a file storage apparatus (D) 104 that has storage devices belonging to a low-order tier (Tier 3); and the file storage apparatuses 101, 102, 103 are connected to each other via the network 111 and the file storage apparatuses 103, 104 are connected to each other via a network 112. The network 112 is composed of a WAN or LAN.

Incidentally, the file storage apparatuses 101, 102, 103 are the same as those in the first embodiment. The file storage apparatus 104 is the same as one used in the second embodiment, except that the type of the storage devices is different from that in the second embodiment. Specifically speaking, regarding the storage devices constituting the disk array apparatus 3400, second storage devices belonging to Tier 2 are used in the second embodiment, but third storage devices belonging to Tier 3 are used in this embodiment.

The memory 300 in the file storage apparatus 103 for Tier 2 stores those having the same functions as the target file searcher 2107, the migration engine 2108, the migration performance log 2109, and the target file lists 2110 from among those stored in the memory 2000 in the file storage apparatus 101, 102.

Figure 17:
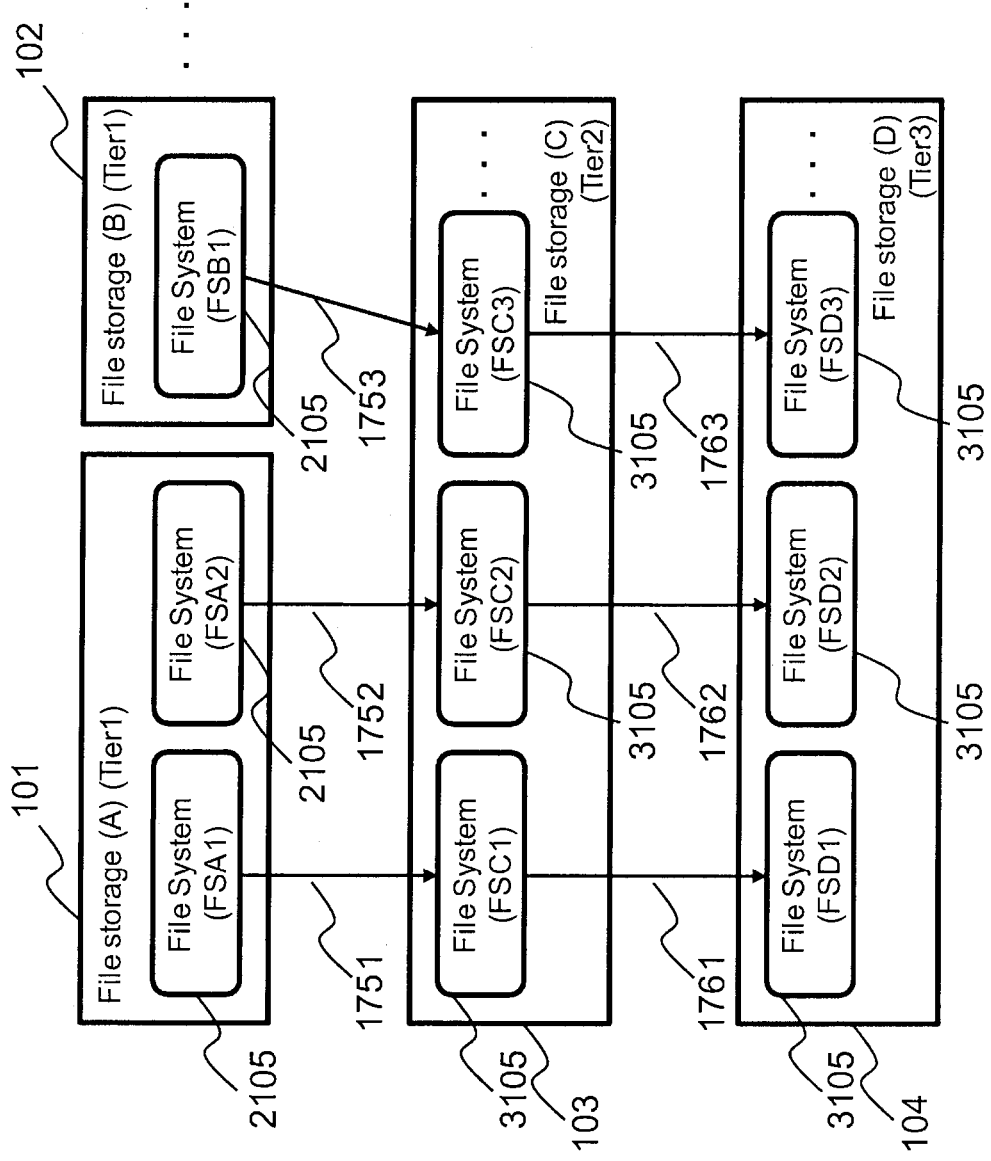
FIG. 17 is a schematic illustration for explaining migrations executed between the file systems in Tier 1, Tier 2, and Tier 3.

FIG. 17 is a schematic illustration explaining the relationship between the plurality of file systems where file migrations are executed between the file storage apparatuses for Tier 1, Tier 2, and Tier 3 according to this embodiment.

FIG. 17 shows an example in which a first file system is a file system FSA1 and a second file system is FSA2 from among the file systems 2105 belonging to the file storage apparatus (A) 101 for Tier 1, a first file system is a file system FSB1 from among the file systems 2105 belonging to the file storage apparatus (B) 102, and a first file system is a file system FSC1, a second file system is a file system FSC2, and a third file system is a file system FSC3 from among the file systems 3105 belonging to the file storage apparatus (C) 103 for Tier 2.

Under this circumstance, the migration engine 2108 for Tier 1 executes a file migration 1751 from the file system FSA1 to the file system FSC1, a file migration 1752 from the file system FSA2 to the file system FSC2, and a file migration 1753 from the file system FSB1 to the file system FSC3 between Tier 1 and Tier 2.

Furthermore, when a first file system is a file system FSD1, a second file system is a file system FSD2, and a third file system is a file system FSD3 from among the file systems 3105 belonging to the file storage apparatus (D) 104 for Tier 3, the migration engine 2108 for Tier 2 executes a file migration 1761 from the file system FSC1 to the file system FSD1, a file migration 1762 from the file system FSC2 to the file system FSD2, and a file migration 1763 from the file system FSC1 to the file system FSD3 between Tier 2 and Tier 3.

Figure 18:
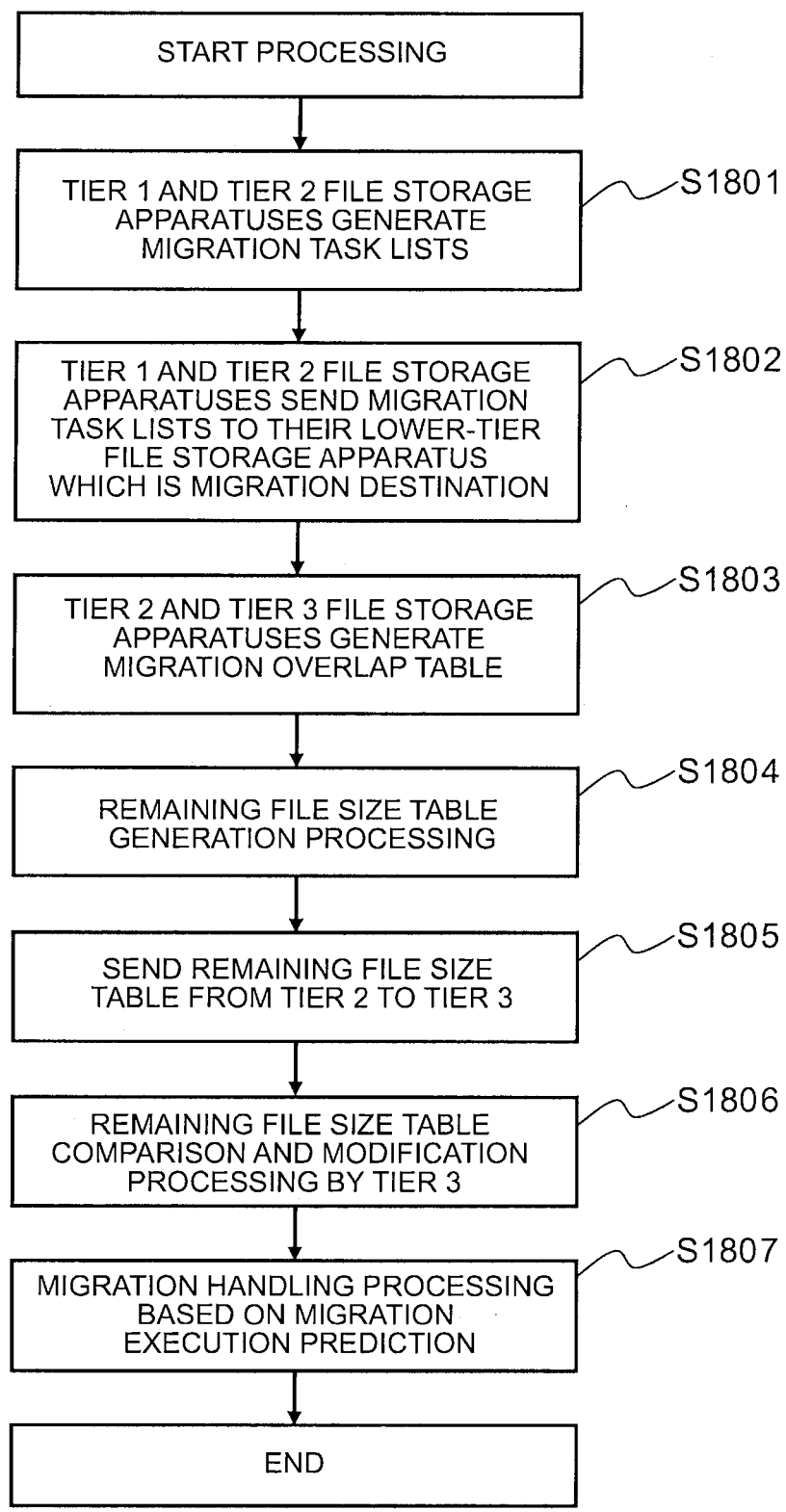
FIG. 18 is a flowchart illustrating the overall processing according to the third embodiment.

Next, a flow of the overall processing according to this embodiment will be explained with reference to the flowchart in FIG. 18.

The pre-migration processor 2101 for the file storage apparatus 101, 102 for Tier 1 firstly generates the migration task list 2102 and the pre-migration processor 3101 for the file storage apparatus 103 for Tier 2 generates the migration task list 3102 (S1801); and each pre-migration processor 2101, 3101 sends the generated migration task list 2102 or migration task list 3102 to the file storage apparatus in a tier lower than its own tier (to Tier 2 in the case of Tier 1, and to Tier 3 in the case of Tier 2) (S1802).

Specifically speaking, all the file storage apparatuses 101, 102 for Tier 1 send the migration task lists 2102 to the file storage apparatus 103 for Tier 2, which is the migration destination, and the file storage apparatus 103 for Tier 2 retains the migration task lists 2102 as the migration task lists 3102.

Similarly, the file storage apparatus 103 for Tier 2 sends each migration task list 3102 to the file storage apparatus 104 for Tier 3, which is the migration destination, and the file storage apparatus 104 for Tier 3 retains the migration task lists 3102.

Each of the pre-migration processor 2101 for Tier 2 and the pre-migration processor 3101 for Tier 3 generates the migration overlap table 2102 or 3102 based on the migration start time 502 and migration stop date 503 described in the migration task lists 2102 or 3102 received from their high-order tier (S1803).

In this step, the pre-migration processor 3101 for Tier 2 generates the migration overlap list 3103 based on both the migration task lists 2102 sent from Tier 1 and the migration task lists 3102 generated in Tier 2. As a result, the pre-migration processor 3101 for Tier 2 can judge whether the migration tasks whose migration destination is Tier 2 overlap with the migration tasks whose migration source is Tier 2.

Furthermore, each of the pre-migration processor 2101 for Tier 2 and the pre-migration processor 3101 for Tier 3 executes processing for generating the remaining file size table 2104, 3104 based on information in the migration overlap table 2103, 3103, which it generated, and the migration task lists 2102 and 3102 received from their high-order tier (S1804). The details of this processing are indicated, as in the first embodiment, in the flowcharts in FIG. 9 and FIG. 10.

The pre-migration processor 2101 for Tier 2 sends the generated remaining file size table 2104 to the file storage apparatus 104 for Tier 3 (S1805).

The file storage apparatus 104 for Tier 3 compares the remaining file size table 2104 received from Tier 2 with the remaining file size table 3104, which it generated, and then executes processing for modifying the remaining file size table 3104 based on this comparison result (S1806). The specific details of this processing are indicated by the flowchart in FIG. 19.

Next, the pre-migration processor 2101 for Tier 2 and the pre-migration processor 3101 for Tier 3 execute countermeasure processing for the prediction result about whether the migration execution will be successful or not, based on the information recorded in the remaining file size table 2104 or 3104 (S1807). The details of this processing are indicated, as in the first embodiment, by the flowchart in FIG. 11.

Figure 19:
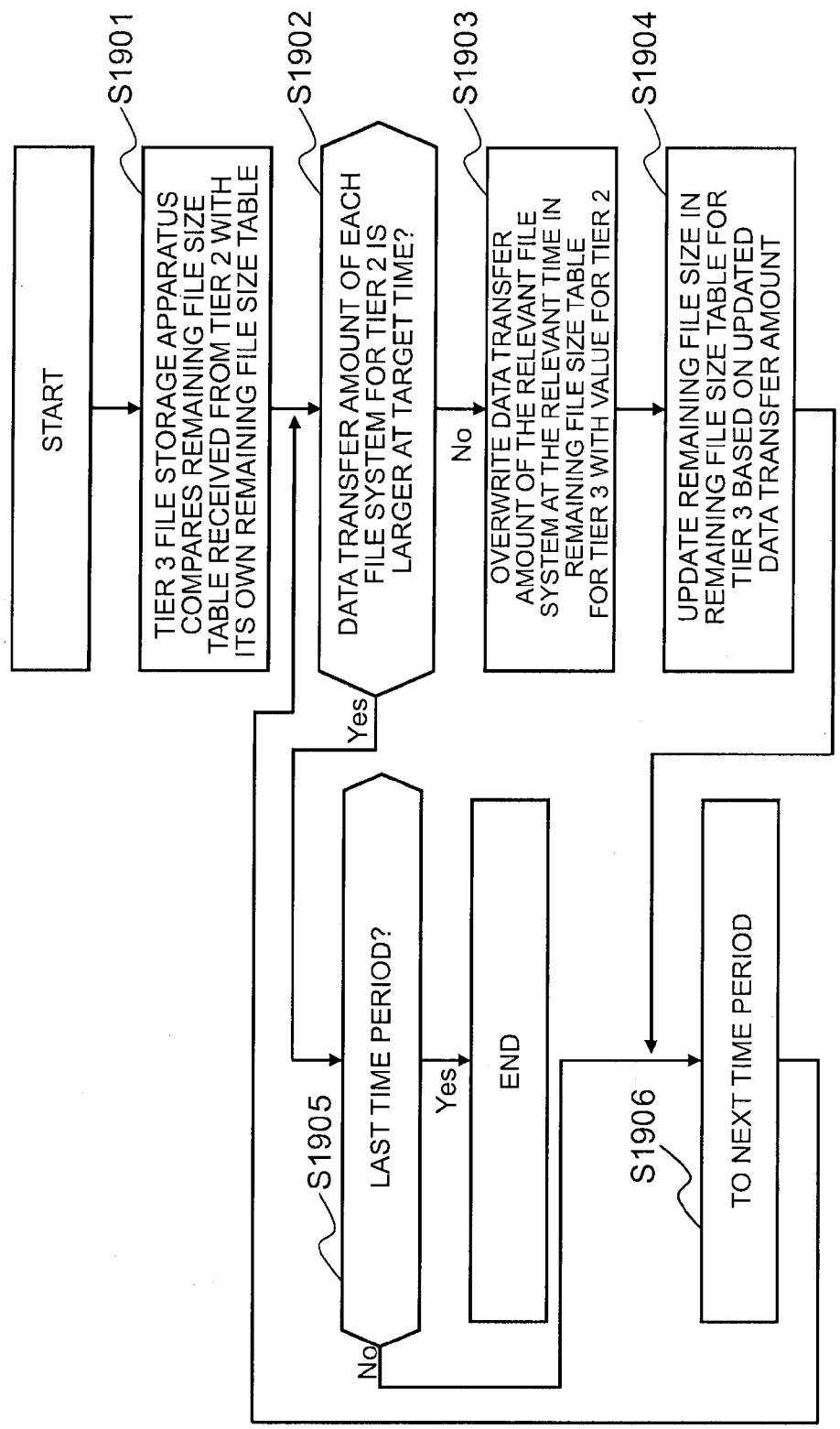
FIG. 19 is a flowchart illustrating processing for comparing the remaining file size tables for Tier 2 and Tier 3 and modifying the remaining file size table.

FIG. 19 is a flowchart illustrating processing for comparing, in Tier 3, the remaining file size table from Tier 2 with the remaining file size table generated in Tier 3 and modifying the remaining file size table based on the comparison result.

After receiving the remaining file size table 2104 from Tier 2, the pre-migration processor 3101 for Tier 3 compares the remaining file size table 2104 from Tier 2 with the remaining file size table 3104 generated in Tier 3 for each file system at each time (S1901).

Next, the pre-migration processor 3101 for Tier 3 judges, based on the comparison result at each time, whether or not the data transfer amount 702 for Tier 2 is larger than that for Tier 3 with regard to each file system (S1902).

If the data transfer amount 702 of the relevant file system for Tier 3 is larger than that for Tier 2, that means migrations from Tier 1 and migrations to Tier 3 overlap with each other in the file storage apparatus 103 for Tier 2 and the load due to the overlapping migrations is imposed on the file storage apparatus 103 for Tier 2. Therefore, regarding the actual data transfer amount, the value on Tier 2 side is an accurate predicted value.

So, if it is determined in step S1902 that the data transfer amount 702 for the relevant file system for Tier 3 is larger than that for Tier 2 (S1902: No), the pre-migration processor 3101 for Tier 3 overwrites the data transfer amount 702 in the remaining file size table 3104 for Tier 3 with the data transfer amount 702 in the remaining file size table 2104 for Tier 2 (S1903).

Subsequently, the pre-migration processor 3101 for Tier 3 also updates the value of the remaining file size 703 in the remaining file size table 3104 for Tier 3 based on the value of the updated data transfer amount 702 (S1904).

On the other hand, if it is determined in step S1902 that the data transfer amount 702 for the relevant file system for Tier 2 is larger than that for Tier 3 (S1902: Yes), the pre-migration processor 3101 for Tier 3 judges whether the comparison target time is the last time period or not (S1905). If the comparison target time is the last time period, the pre-migration processor 3101 for Tier 3 terminates the processing in this routine; and if the comparison target time is not the last time period, the pre-migration processor 3101 for Tier 3 recognizes the next time period as the comparison target (S1906) and repeats the processing from step S1902 to step S1906.

As a result of the above-described processing, whether the migration execution will be successful or not can be predicted in advance by reflecting the data transfer amount in the case where the load is concentrated on Tier 2 located as the intermediate tier.

After receiving this prediction result about whether the migration execution will be successful or not, it is possible to take actions for the case where the failure of the migration execution is predicted due to the concentration of the load on Tier 1, by executing the countermeasure processing based on the prediction result about whether the migration execution will be successful or not, as shown in the flowchart in FIG. 11 in the same manner as in the first embodiment.

When this happens, the remaining file size table 3104 may be updated by reflecting the cessation of the migration tasks in Tier 2 or the change of the execution time. This can enhance the accuracy of the prediction.

Furthermore, the user can obtain information appropriately and perform countermeasure operation based on the obtained information by using the GUI screen 1200 as shown in FIG. 12.

In this embodiment, the migration task list 2102 is generated with regard to each of the plurality of file systems (FSA1, FSA2, FSB1) existing in the plurality of file storage apparatuses 101, 102 for Tier 1 and the migration task lists 2102 are sent to the file storage apparatus 103 for Tier 2 before file migrations are executed by the migration engine 2108 between the plurality of file systems (FSA1, FSA2, FSB1) in the plurality of file storage apparatus 101, 102 for Tier 1 and the plurality of file systems (FSC1, FSC2, FSC3) in the file storage apparatus 103 for Tier 2 or between the plurality of file systems (FSC1, FSC2, FSC3) in the file storage apparatus 103 for Tier 2 and the plurality of file systems (FSD1, FSD2, FSD3) in the file storage apparatus 104 for Tier 3.

Also, the migration task list 2102 is generated with regard to each of the plurality of file systems (FSC1, FSC2, FSC3) existing in the file storage apparatus 103 for Tier 2 and the migration task lists 2102 are sent to the file storage apparatus 104 for Tier 3.

When this happens, Tier 3 generates the migration overlap table 3103, which shows the degree of how migrations overlap with each other in Tier 3, and the remaining file size table 3104, which shows the amount of data to be migrated by the execution of migration; and at the same time, Tier 2 also generates the migration overlap table 2103 and the remaining file size table 2104 and sends the generated migration overlap table 2103 and remaining file size table 2104 to Tier 3.

Tier 3 compares the remaining file size table 2104 from Tier 2 with the remaining file size table 3104, which it retains, and modifies the remaining file size table 3104 based on this comparison result. As a result, whether the migration execution will be successful or not can be predicted in advance even in the circumstance where the load is concentrated on Tier 2.

In other words, the pre-migration processor 3101 for Tier 3 can predict whether the migration execution by the migration engine will be successful or not, based on the remaining file size table 3104.

Under this circumstance, if the pre-migration processor 3101 for Tier 3 predicts that the migration execution by the migration engine for Tier 2 will fail, and on condition that the scheduled time periods for the migration execution of the migration task for the file system, for which the failure of the migration execution by the migration engine for Tier 2 is predicted, from among each of the migration source file systems, overlap with the scheduled time periods for the migration execution of a migration task(s) for another file system, the pre-migration processor 3101 for Tier 3 can give a command to the migration engine for Tier 2 to stop the execution of a low-priority migration task(s) from among the migration tasks belonging to the file systems which are the targets of the migration execution by the migration engine for Tier 2.

Subsequently, the pre-migration processor 3101 for Tier 3 updates the remaining file size table 3104 according to the content regarding which the command was given to the migration engine for Tier 2; and can predict again whether the migration by the migration engine for Tier 2 will be executed successfully or not, based on information recorded in the updated remaining file size table 3104.

Furthermore, if the pre-migration processor 3101 for Tier 3 predicts that the migration execution by the migration engine for Tier 2 will fail, and on condition that the scheduled time periods for the migration execution of the migration task for the file system, for which the failure of the migration execution by the migration engine for Tier 2 is predicted, from among each of the migration source file systems, do not overlap with the scheduled time periods for the migration execution of a migration task(s) for another file system, the pre-migration processor 3101 for Tier 3 calculates time required to be added as the scheduled time period in order to make the predicted value for the last scheduled time period of the scheduled time periods for the migration execution, from among the remaining file size 703 in the remaining file size table 3104 as recorded for the file system, for which the failure of the migration execution by the migration engine for Tier 2 is predicted, become equal to or less than 0.

Subsequently, the pre-migration processor 3101 for Tier 3 gives a command to the pre-migration processor 3101 for Tier 2 to change the scheduled time periods for the migration execution based on the calculation result of the additional time, and updates the remaining file size table 3104 according to the calculation result of the additional time; and can predict again whether the migration by the migration engine for Tier 2 will be executed successfully or not, based on information recorded in the updated remaining file size table 3104.

Furthermore, in this embodiment, the pre-migration processor 3101 for Tier 2 generates, based on the generated migration task list 3102, the migration overlap table 3103 which records, for each unit time, whether the migration execution by the migration engine for Tier 2 is scheduled or not, with respect to each of the migration source file systems whose at least part of the scheduled time periods from among the scheduled time periods for the migration execution overlap with each other; and also generates, based on the generated migration overlap table 3103 for Tier 2, the remaining file size table 3104 which records, for each of the migration source file systems, a predicted value of the data transfer amount 702 for each unit time and a predicted value of the remaining file size 703 for each unit time; and then transfers the generated remaining file size table 3104 for Tier 2 to the pre-migration processor 3101 for Tier 3.

The pre-migration processor 3101 for Tier 3 compares the predicted value of the data transfer amount 702 for each unit time, which is recorded in the remaining file size table 3104 for Tier 2, with the predicted value of the data transfer amount 702 for each unit time, which is recorded in the remaining file size table 3104 for Tier 3; and on condition that the predicted value of the data transfer amount 702, which is recorded in the remaining file size table 3104 for Tier 3, is larger than the predicted value of the data transfer amount 702, which is recorded in the remaining file size table 3104 for Tier 2, the pre-migration processor 3101 for Tier 3 updates the predicted value of the data transfer amount 702, which is recorded in the remaining file size table 3104 for Tier 3, with the predicted value of the data transfer amount 702, which is recorded in the remaining file size table 3104 for Tier 2. As a result, the pre-migration processor 3101 for Tier 3 can predict, based on the updated remaining file size table 3104 for Tier 3, whether the migration execution by the migration engine for Tier 2 will be successful or not.

According to this embodiment, whether the migration execution will be successful or not can be predicted accurately in advance even in the circumstance where the load is concentrated on Tier 2.

Moreover, even in the circumstance where the load is concentrated on Tier 2, it is possible according to this embodiment to take measures for reducing the load by increasing the migration execution time or stopping the execution of part of the overlapping migration tasks, based on the prediction result about whether the migration execution will be successful or not.

Furthermore, with the hierarchical file storage system in which files are migrated between a plurality of file storage apparatuses, the total migration target file size and the migration execution time periods are associated with each other and recorded and the recorded information can be aggregated and retained in the file storage apparatus in the low-order tier.

In this case, the degree of load concentration, in a case where migrations are executed during the same time period in the file storage apparatuses in the high-order tier and the low-order tier, can be predicted by using the recorded information; and time, the amount of data to be transferred, and the amount of remaining files without being migrated can be recorded as the prediction result.

If it is estimated that the file migration will not be completed within the set time, the failure of the migration due to the load concentration can be avoided by giving a command from the low-order tier to the high-order tier to stop the file migration or change the execution time period.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above.

For example, part of the configuration of each embodiment can be replaced with the configuration of another embodiment and the configuration of another embodiment can be added to the configuration of a certain embodiment. Furthermore, part of the configuration of each embodiment can be deleted, or added to, or replaced with, the configuration of another configuration.

Furthermore, part or all of the aforementioned configurations, functions, processing units, and so on may be realized by hardware by, for example, designing them in integrated circuits. Also, each of the aforementioned configurations, functions, and so on may be realized by software by the processors interpreting and executing programs for realizing each of the functions. Information such as programs, tables, and files for realizing each of the functions may be recorded and retained in storage devices such as memories, hard disks, and SSDs (Solid State Drives) or storage media such as IC cards, SD cards, and DVDs.

Reference Signs List

101 File storage apparatus (A)
102 File storage apparatus (B)
103 File storage apparatus (C)
104 LAN/WAN
2000 Memory
2100 OS
2101 Pre-migration processor
2102 Migration task list
2103 Migration overlap table
2104 Remaining file size table
2105 File system
2106 File sharing service
2107 Target file searcher
2108 Migration engine
2109 Migration performance log
2110 Target file list
2200 CPU
2300 Network interface
2400 Disk array apparatus
2401 Volume
3000 Memory
3100 OS
3101 Pre-migration processor
3102 Migration task list
3103 Migration overlap table
3104 Remaining file size table
3105 File system
3200 CPU
3300 Network interface
3400 Disk array apparatus
3401 Volume

The invention claimed is:

1. A storage system comprising:
a plurality of first file storage apparatuses including a first storage apparatus having a plurality of first volumes constituting a logical storage area of a first storage device, and a first controller for controlling data input/output processing on a plurality of first file systems constructed on the first volumes of the first storage apparatus; and
a second file storage apparatus connected to the first file storage apparatus via a first network, the second file storage apparatus including a second storage apparatus having a plurality of second volumes constituting a logical storage area of a second storage device, and a second controller for controlling data input/output processing on a plurality of second file systems constructed on the second volumes of the second storage apparatus;
wherein the first controller includes a first pre-migration processor for generating a first migration task list that associates and records information about scheduled time periods for execution of a first migration from the first file systems to the second file systems and a total file size of files, which are targets of the first migration, with a file system which is a first migration destination, and then transferring the generated first migration task list to the second file storage apparatus before execution of the first migration;
wherein the second controller includes a second pre-migration processor for generating, based on the first migration task list transferred from the first pre-migration processor, a second migration overlap table that records, for each unit time, whether the execution of the first migration is scheduled or not for each of the file systems which are a first migration sources whose at least part of the scheduled time periods for the execution of the first migration overlaps with each other; and generating, based on the generated second migration overlap table, a second remaining file size table that records, for each of the file systems which are the first migration sources, a predicted value of a data transfer amount per unit time and a predicted value of a remaining file size per unit time; and wherein the second pre-migration processor predicts, based on the generated second remaining file size table, whether the first migration will be executed successfully or not.

2. The storage system according to claim 1, wherein the second pre-migration processor judges, with respect to each file system which is the migration source, whether the predicted value in a last scheduled time period of the scheduled time periods for the execution of the first migration, from among the predicted value of the remaining file size for each unit time as recorded in the generated second remaining file size table, is more than 0 or not; and if the predicted value in the last scheduled time period of the scheduled time periods for the execution of the first migration is equal to or less than 0, the second pre-migration processor predicts that the first migration will be executed successfully; and if the predicted value in the last scheduled time period of the scheduled time periods for the execution of the first migration is more than 0, the second pre-migration processor predicts that the execution of the first migration will fail.

3. The storage system according to claim 2, wherein if the second pre-migration processor predicts that the execution of the first migration will fail, and on condition that the scheduled time period for the execution of the first migration for a migration task of the file system regarding which the failure of the execution of the first migration is predicted, from among each of the file systems which are the first migration sources, overlaps with the scheduled time period for the execution of the first migration for a migration task of another file system, the second pre-migration processor gives a command to the first pre-migration processor to stop the execution of a low-priority migration task from among migration tasks belonging to the file systems which are targets of execution of the first migration, updates the second remaining file size table according to the content of the command, and then predicts again whether the first migration will be executed successfully or not, based on the updated second remaining file size table.

4. The storage system according to claim 3, wherein the second pre-migration processor designates a migration task belonging to a file system with a large unused capacity, from among each of the file systems which are the first migration sources, as the low-priority migration task from among migration tasks belonging to the file systems which are the targets of execution of the first migration.

5. The storage system according to claim 2, wherein if the second pre-migration processor predicts that the execution of the first migration will fail, and on condition that the scheduled time period for the execution of the first migration for a migration task of the file system regarding which the failure of the execution of the first migration is predicted, from among each of the file systems which are the first migration sources, does not overlap with the scheduled time period for the execution of the first migration for a migration task of another file system, the second pre-migration processor calculates time required to be added as the scheduled time period in order to make the predicted value of the remaining file size in the second file size table recorded for the file system, for which the failure of the execution of the first migration is predicted, in the last scheduled time period, from among the scheduled time periods for the execution of the first migration, become equal to or less than 0; gives a command to the first pre-migration processor to change the scheduled time period for execution of the first migration based on the calculation result; updates the second remaining file size table according to the calculation result; and predicts again whether the first migration will be executed successfully or not, based on the updated second remaining file size table.

6. The storage system according to claim 1, wherein the first pre-migration processor generates, based on the generated first migration task list, a first migration overlap table that records, for each unit time, whether the execution of the first migration is scheduled or not for each of the file systems which are the first migration sources whose at least part of the scheduled time periods for the execution of the first migration overlaps each other; generates, based on the generated first migration overlap table, a first remaining file size table that records, for each of the file systems which are the first migration sources, a predicted value of a data transfer amount per unit time and a predicted value of a remaining file size per unit time; and transfers the generated first remaining file size table to the second pre-migration processor;

wherein the second pre-migration processor compares the predicted value of the data transfer amount for each unit time, which is recorded in the first remaining file size table, with the predicted value of the data transfer amount for each unit time, which is recorded in the second remaining file size table; and on condition that the predicted value of the data transfer amount, which is recorded in the second remaining file size table, is larger than the predicted value of the data transfer amount, which is recorded in the first remaining file size table, the second pre-migration processor updates the predicted value of the data transfer amount, which is recorded in the second remaining file size table, with the predicted value of the data transfer amount, which is recorded in the first remaining file size table; and the second pre-migration processor then predicts whether the first migration will be executed successfully or not, based on the updated second remaining file size table.

7. The storage system according to claim 1, further comprising a third file storage apparatus connected to the second file storage apparatus via a second network, the third file storage apparatus including a third storage apparatus having a plurality of third volumes constituting a logical storage area of a third storage device, and a third controller for controlling data input/output processing on a plurality of third file systems constructed on the third volumes of the third storage apparatus;

wherein the second pre-migration processor generates a second migration task list that associates and records information about scheduled time periods for execution of a second migration from the second file systems to the third file systems and a total file size of files, which are targets of the second migration, with a file system which is a second migration destination, and then transferring the generated second migration task list to the third file storage apparatus before execution of the second migration;

wherein the third controller generates, based on the second migration task list transferred from the second pre-migration processor, a third migration overlap table that records, for each unit time, whether the execution of the second migration is scheduled or not for each of the file systems which are a second migration source, whose at least part of the scheduled time periods for the execution of the second migration overlaps with each other; and generates, based on the generated third migration overlap table, a third remaining file size table that records, for each of the file systems which are the second migration sources, a predicted value of a data transfer amount per unit time and a predicted value of a remaining file size per unit time; and wherein the third pre-migration processor predicts, based on the generated third remaining file size table, whether the second migration will be executed successfully or not.

8. The storage system according to claim 7, wherein if the third pre-migration processor predicts that the execution of the second migration will fail, and on condition that the scheduled time period for the execution of the second migration for a migration task of the file system regarding which the failure of the execution of the second migration is predicted, from among each of the file systems which are the second migration sources, overlaps with the scheduled time period for the execution of the second migration for a migration task of another file system, the third pre-migration processor gives a command to the second pre-migration processor to stop the execution of a low-priority migration task from among migration tasks belonging to the file systems which are targets of execution of the second migration, updates the third remaining file size table according to the content of the command, and then predicts again whether the second migration will be executed successfully or not, based on the updated third remaining file size table.

9. The storage system according to claim 7, wherein if the third pre-migration processor predicts that the execution of the second migration will fail, and on condition that the scheduled time period for the execution of the second migration for a migration task of the file system regarding which the failure of the execution of the second migration is predicted, from among each of the file systems which are the second migration sources, does not overlap with the scheduled time period for the execution of the second migration for a migration task of another file system, the third pre-migration processor calculates time required to be added as the scheduled time period in order to make the predicted value of the remaining file size in the third file size table recorded for the file system, for which the failure of the execution of the second migration is predicted, in the last scheduled time period, from among the scheduled time periods for the execution of the second migration, become equal to or less than 0; gives a command to the second pre-migration processor to change the scheduled time period for execution of the second migration based on the calculation result;

updates the third remaining file size table according to the calculation result; and predicts again whether the second migration will be executed successfully or not, based on the updated third remaining file size table.

10. The storage system according to claim 7, wherein the second pre-migration processor generates, based on the generated second migration task list, a second migration overlap table that records, for each unit time, whether the execution of the second migration is scheduled or not for each of the file systems which are the second migration sources whose at least part of the scheduled time periods for the execution of the second migration overlaps with each other; generates, based on the generated second migration overlap table, a second remaining file size table that records, for each of the file systems which are the second migration sources, a predicted value of a data transfer amount per unit time and a predicted value of a remaining file size per unit time; and transfers the generated second remaining file size table to the third pre-migration processor;

wherein the third pre-migration processor compares the predicted value of the data transfer amount for each unit time, which is recorded in the second remaining file size table, with the predicted value of the data transfer amount for each unit time, which is recorded in the third remaining file size table; and on condition that the predicted value of the data transfer amount, which is recorded in the third remaining file size table, is larger than the predicted value of the data transfer amount, which is recorded in the second remaining file size table, the third pre-migration processor updates the predicted value of the data transfer amount, which is recorded in the third remaining file size table, with the predicted value of the data transfer amount, which is recorded in the second remaining file size table; and the third pre-migration processor then predicts whether the second migration will be executed successfully or not, based on the updated third remaining file size table.

11. A method for operating a computer system comprising:

a plurality of first file storage apparatuses including a first storage apparatus having a plurality of first volumes constituting a logical storage area of a first storage device, and a first controller for controlling data input/output processing on a plurality of first file systems constructed on the first volumes of the first storage apparatus; and a second file storage apparatus connected to the first file storage apparatus via a first network, the second file storage apparatus including a second storage apparatus having a plurality of second volumes constituting a logical storage area of a second storage device, and a second controller for controlling data input/output processing on a plurality of second file systems constructed on the second volumes of the second storage apparatus;

wherein the first controller includes a first pre-migration processor for generating a first migration task list that associates and records information about scheduled time periods for execution of a first migration from the first file systems to the second file systems and a total file size of files, which are targets of the first migration, with a file system which is a first migration destination, and then transferring the generated first migration task list to the second file storage apparatus before execution of the first migration;

wherein the second controller includes a second pre-migration processor for generating, based on the first migration task list transferred from the first pre-migration processor, a second migration overlap table that records, for each unit time, whether the execution of the first migration is scheduled or not for each of the file systems which are first migration sources whose at least part of the scheduled time periods for the execution of the first migration overlaps with each other; and generating, based on the generated second migration overlap table, a second remaining file size table that records, for each of the file systems which are the first migration sources, a predicted value of a data transfer amount per unit time and a predicted value of a remaining file size per unit time; and wherein the storage system operation method comprising a step executed by the second pre-migration processor for predicting, based on the generated second remaining file size table, whether the first migration will be executed successfully or not.

12. The storage system operation method according to claim 11, further comprising:
   a step executed by the second pre-migration processor for judging, with respect to each file system which is the migration source, whether the predicted value in a last scheduled time period of the scheduled time periods for the execution of the first migration, from among the predicted value of the remaining file size for each unit time as recorded in the generated second remaining file size table, is more than 0 or not;
   a step executed by the second pre-migration processor for predicting that the first migration will be executed successfully if the predicted value in the last scheduled time period of the scheduled time periods for the execution of the first migration is equal to or less than 0; and
   a step executed by the second pre-migration processor for predicting that the execution of the first migration will fail if the predicted value in the last scheduled time period of the scheduled time periods for the execution of the first migration is more than 0.

13. The storage system operation method according to claim 12, further comprising:
   a step executed by the second pre-migration processor for giving a command to the first pre-migration processor to stop the execution of a low-priority migration task from among migration tasks belonging to the file systems which are targets of execution of the first migration if the second pre-migration processor predicts that the execution of the first migration will fail, and on condition that the scheduled time period for the execution of the first migration for a migration task of the file system regarding which the failure of the execution of the first migration is predicted, from among each of the file systems which are the first migration sources, overlaps with the scheduled time period for the execution of the first migration for a migration task of another file system;
   a step executed by the second pre-migration processor for updating the second remaining file size table according to the content of the command; and
   a step executed by the second pre-migration processor for predicting again whether the first migration will be executed successfully or not, based on the updated second remaining file size table.

14. The storage system operation method according to claim 11, further comprising:
   a step executed by the first pre-migration processor for generating, based on the generated first migration task list, a first migration overlap table that records, for each unit time, whether the execution of the first migration is scheduled or not for each of the file systems which are the migration sources whose at least part of the scheduled time periods for the execution of the first migration overlaps with each other;
   a step executed by the first pre-migration processor for generating, based on the generated first migration overlap table, a first remaining file size table that records, for each of the file systems which are the migration sources, a predicted value of a data transfer amount per unit time and a predicted value of a remaining file size per unit time;
   a step executed by the first pre-migration processor for transferring the generated first remaining file size table to the second pre-migration processor;
   a step executed by the second pre-migration processor for comparing the predicted value of the data transfer amount for each unit time, which is recorded in the first remaining file size table, with the predicted value of the data transfer amount for each unit time, which is recorded in the second remaining file size table;
   a step executed by the second pre-migration processor, on condition that the predicted value of the data transfer amount, which is recorded in the second remaining file size table, is larger than the predicted value of the data transfer amount, which is recorded in the first remaining file size table, for updating the predicted value of the data transfer amount, which is recorded in the second remaining file size table, with the predicted value of the data transfer amount, which is recorded in the first remaining file size table; and
   a step executed by the second pre-migration processor for predicting whether the first migration will be executed successfully or not, based on the updated second remaining file size table.

15. The storage system operation method according to claim 11, wherein the storage system further includes a third file storage apparatus connected to the second file storage apparatus via a second network, the third file storage apparatus including a third storage apparatus having a plurality of third volumes constituting a logical storage area of a third storage device, and a third controller for controlling data input/output processing on a plurality of third file systems constructed on the third volumes of the third storage apparatus;
   wherein the third controller has a third pre-migration processor; and
   wherein the storage system operation method further comprises:
   a step executed by the second pre-migration processor for generating a second migration task list that associates and records information about scheduled time periods for execution of a second migration from the second file systems to the third file systems and a total file size of files, which are targets of the second migration, with a file system which is a second migration destination;
   a step executed by the second pre-migration processor for transferring the generated second migration task list to the third file storage apparatus before execution of the second migration;
   a step executed by the third pre-migration processor for generating, based on the second migration task list transferred from the second pre-migration processor, a third migration overlap table that records, for each unit time, whether the execution of the second migration is scheduled or not for each of the file systems which are second migration sources whose at least part of the scheduled time periods for the execution of the second migration overlaps with each other;
   a step executed by the third pre-migration processor for generating, based on the generated third migration overlap table, a third remaining file size table that records, for each of the file systems which are the second migration sources, a predicted value of a data transfer amount per unit time and a predicted value of a remaining file size per unit time; and
   a step executed by the third pre-migration processor for predicting, based on the generated third remaining file size table, whether the second migration will be executed successfully or not.

* * * * *